(12) United States Patent
Nghiem

(10) Patent No.: US 6,581,982 B1
(45) Date of Patent: Jun. 24, 2003

(54) METHOD FOR CONNECTING A PIPE AND A PIPE COUPLING, LINK BETWEEN A PIPE AND A PIPE COUPLING, AND CONNECTOR USED

(75) Inventor: Xuan Luong Nghiem, Krefeld (DE)

(73) Assignee: Novopress GmbH Pressen und Presswerkzeuge & Co., KG (DE)

( * ) Notice: Subject to any disclaimer, the term of this patent is extended or adjusted under 35 U.S.C. 154(b) by 0 days.

(21) Appl. No.: 09/530,516
(22) PCT Filed: Oct. 30, 1998
(86) PCT No.: PCT/EP98/06881
§ 371 (c)(1), (2), (4) Date: May 2, 2000
(87) PCT Pub. No.: WO99/23406
PCT Pub. Date: May 14, 1999

(30) Foreign Application Priority Data

Nov. 3, 1997 (EP) .............................. 97119127
Jul. 3, 1998 (EP) .............................. 98112355

(51) Int. Cl.[7] .............................................. F16L 13/14
(52) U.S. Cl. ..................................... 285/382; 285/256
(58) Field of Search ................................ 285/256, 382, 285/382.7, 259

(56) References Cited

U.S. PATENT DOCUMENTS

| 4,564,223 A | * | 1/1986 | Burrington | 285/256 |
| 4,598,938 A | | 7/1986 | Boss et al. | 285/382.2 |
| 4,671,542 A | * | 6/1987 | Juchnowski | 285/256 |
| 5,332,269 A | * | 7/1994 | Homm | 285/39 |
| 5,358,012 A | * | 10/1994 | Kish | 138/109 |
| 5,388,873 A | * | 2/1995 | Enayati | 285/256 |
| 5,470,113 A | | 11/1995 | Schwalm et al. | 285/255 |
| 5,707,087 A | * | 1/1998 | Ridenour et al. | 285/331 |

FOREIGN PATENT DOCUMENTS

| DE | 4243625 | 6/1994 |
| DE | 9419106 | 3/1995 |
| DE | 4441373 | 5/1996 |
| DE | 19637308 | 10/1997 |
| EP | 198789 | 10/1986 |
| EP | 546405 | 6/1993 |
| EP | 582543 | 2/1994 |
| EP | 774611 | 5/1997 |
| WO | 9209840 | 11/1991 |
| WO | 9424475 | 10/1994 |

OTHER PUBLICATIONS

Patent Abstracts of Japan, Pub. No. 08326974A (1 pg.).
Copy of International Search Report of PCT/EP 98/06881.
German Patent Appln. No. 197 49 748.9–24 of Apr. 28, 1998.

* cited by examiner

Primary Examiner—Jack Lavinder
Assistant Examiner—Bradley King
(74) Attorney, Agent, or Firm—Liniak, Berenato & White, LLC

(57) ABSTRACT

The invention relates to a process for connecting a pipe (2, 31) in the region of its pipe end to a pipe coupling (1), comprising at least one support sleeve (3) with engagement elements (5, 65, 67, 124), in which context the pipe (2, 31) and the support sleeve (3) are first pushed into one another, the pipe (2, 31) then being pressure deformed, thereby bringing about a form-fitting connection with the engagement elements (5, 65, 67, 125) and bringing about a sealing relationship with sealing surfaces (7, 66, 68, 122), mutually adjoining each other in axial direction. The process is characterised in that an axial force, bearing on the sealing surfaces (7, 66, 68, 122) is applied to the pipe (2, 31) by way of a spring device (20, 52) deriving support from the pipe coupling (1) and that a facility for expansion is provided for the pipe (2, 31) on the side of the engagement elements (5, 65, 67, 125) oriented towards the pipe.

9 Claims, 16 Drawing Sheets

Figure 1:
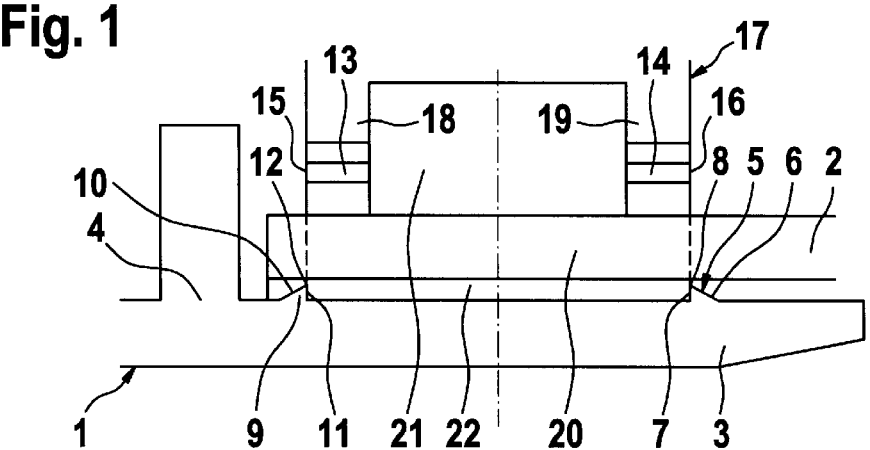

METHOD FOR CONNECTING A PIPE AND A PIPE COUPLING, LINK BETWEEN A PIPE AND A PIPE COUPLING, AND CONNECTOR USED

The invention relates to a process for connecting a pipe in the region of its pipe end to a pipe coupling, comprising at least one support sleeve with an engagement means, wherein the pipe and the support sleeve are first pushed into one another, the pipe then being pressure deformed, thereby bringing about a form-fitting connection with the engagement means and bringing about a sealing relationship with sealing surfaces, mutually adjoining one another in axial direction. The invention relates furthermore to a connection brought about by the aforesaid process as well as to a pipe coupling suited therefor.

Pipe couplings are known for the connection of pipe ends of two pipes or—in the case of branchings—of more than two pipes. The pipe couplings are so designed that they can be brought to overlap the pipes by sliding one into the other. In the overlapping region both sections are subjected to radial pressure deformation which results in bringing about a fluid impermeable connection between the pipe coupling and the pipes.

Depending on the material of the pipes, different pipe couplings are employed according to the state of the art. In the case of metal pipes, sleeve-like press fittings are used, comprising annular bulges at their ends projecting radially outwardly, into which sealing rings are inserted on the inside. Into the press fittings pipes are pushed from both sides. The annular bulges are then pressure deformed radially inwardly by plastic deformation both of the press fitting and also of the pipe, i.e. by means of a pressing device suited for this purpose. An example of such a connection is apparent from EP-A-0 198 789.

The use of sealing rings involves a number of drawbacks. On the one hand, there is no guarantee that the sealing ring remains intact when pushing the pipe into the press fitting, as its diameter is smaller than the outer diameter of the pipe. On the other hand, the chemical and thermal stability of such sealing rings over extended periods is not sufficiently ensured. As such pipe connections are employed in particular in the sanitary and heating sectors, presupposing a useful life of 50 years, high demands are made on the long-term stability of the elastomer used for the sealing ring. For heated and, in particular, chemically aggressive fluids, the working material of the sealing ring must be chemically and thermally resistant and must not lose its sealing capacity even if frequent temperature changes occur.

In order to avoid the use of sealing rings, a pipe connection is proposed in DE-U-94 19 106.9, wherein the press fitting is provided with an elastic plastics or rubber coating. For bringing about the connection, the pipe—this may be a metal or a composite pipe—is expanded and pushed over the press fitting. One or more annular beads are subsequently pressed into the pipe exterior so that the pipe material penetrates into the elastic coating of the press fitting. However, a connection of this type has only a limited useful life and is, above all, not suited for plastic pipes.

For connecting plastic pipes, made of, for example, of crosslinked polyethylene or polypropylene, as well as of composite pipes, comprising successively from inside towards the outside a plastics layer, a metal tube or a metal coating and—as a protective cover—yet another plastics layer, two-part or three-part pipe couplings are proposed (EP-A-0 582 542, WO 92109840; DE-A-44 41 373; DE-C-196 27 608; JP-A-08 326 974). These pipe couplings include an interior component, from the central part of which one or more support sleeves extend, onto each of which a pipe can be pushed. Onto the pipe exterior a single pressure sleeve, engaging over two support sleeves (EP-A-0 582 543) is pushed, or separate pressure sleeves each (WO 92/09840; DE-A-44 41 373; DE-C-196 37 608; JP-A-08 326 974) are pushed onto the pipes and are then pressure deformed radially towards the interior, so that the terminal regions of the pipes between the pressure sleeve(s) and the support sleeves are in each case clamped over a relatively long distance. In order to improve the clamping action, grooves are moulded at least into the support sleeves —partly into the pressure sleeves as well—, into which the plastics material of the pipes is pressed so that a wave-like pattern of the pipes in the clamping regions results, bringing about sealing surfaces adjoining one another in axial direction. In DE-A-196 37 608 specific embodiments of annular grooves in the support sleeve are proposed, into which the plastics material is pressed in order to subsequently bring about a sealing relationship within these grooves.

Such pipe couplings do not require additional sealing rings so that the above described problems do not occur here. On the other hand, their manufacture is more complex as their construction requires them to consist of a plurality of parts, necessitating additional processing steps in order to mould in the grooves. A considerable drawback resides further in the thermal performance of pure plastics or even composite pipes. It shows its negative effect in particular in the case of such pipe ducts which are exposed to considerable temperature fluctuations—such as heating or hot water pipes. During heating, the plastics expands more than the metal of the pipe coupling, resulting in the occurrence of very high tensions in the regions of the clamped pipe, causing plastic flow, i.e., in particular, if the regions of the clamped pipe completely take up the space between the pressure sleeve and the support sleeve. The plastics then literally flows from these pipe regions and therefore out of the pipe coupling. In the course of subsequent cooling, the plastics contracts again, however, due to exceeding the flow limit, it no longer possesses the initial dimensions. The initial clamping pressure between the pipe and the pressure and support sleeve is no longer attained. If a relative movement has taken place between the pipe and the support sleeve, destruction of the plastics along the groove-like sealing points may occur as well.

Even more serious is the fact that the plastics may act like a kind of pump during the expansion and shrinking processes. Should a liquid film have formed in the gap between the upper limiting surfaces of the plastics and the support sleeve, liquid is locked in at indefinable points during heating and therefore expansion of the pipe. This, in turn, results in an increased expansion, as the volume of the enclosed liquid takes away space from the pipe sections clamped there. With repeated heating and cooling cycles, the plastics gradually looses its inherent tension and the original dimensions so that the tightness over extended periods is no longer ensured. One has therefore reverted to ensuring the tightness of the pipe connection by additionally providing sealing rings (WO 92/09840), having to accept once again their above described drawbacks.

When employed in drinking water supplies, a further problem resides in that no cavities must occur in the region of the pipe coupling, as small living organisms, such as germs or the like, may gather and live there. In pipe couplings taking the form of press fittings, in particular, such cavities exist between the press fitting and the pipe end regions. In addition, sealing rings become porous with time, which favours the presence of such living organisms. As far as plastics pipes are concerned, gaps and cavities come about by the above described expansion and shrinking processes, being in direct contact with the liquid. Furthermore, dissolved materials, such as for example magnesium or calcium carbonate, may also enter into the cavities and deposit there, thereby displacing the interface between the pipe end sections and the support sleeve. This promotes the penetration of water.

It is an object of the invention to so design a process of the type set out in the opening paragraph that reliable sealing between the pipe coupling and the pipes, in particular of plastics and composite pipes, is ensured in the long term. It is furthermore an object of the invention to provide a suitable connection therefor between the pipe coupling and the pipes as well as a pipe coupling therefor.

As regards the first part of the object, the solution according to the invention resides in that an axial force, bearing on the sealing surfaces, is applied to the pipe via a spring means, which takes support from the pipe coupling.

The basic concept of the invention is, therefore, the application of a defined axial force to the pipe, which presses the superposed sealing surfaces against one another, thus providing a reliable sealing relationship. It stands to reason that the axial force must be of such magnitude that the stress of the sealing surfaces is sufficiently maintained at all times under the operational conditions, expected to occur, and for the intended life span.

The advantage of the solution according to the invention, on the one hand, resides in that reliable sealing with high long-term stability is attained, even if the pipe is exposed to great temperature fluctuations, i.e. even if an additional sealing ring is dispensed with. On the side towards the fluid, only one sealing locality is necessary in principle so that no cavities form, into which water can enter.

It stands to reason that use is made of the teachings of the invention even if the process is used on a support sleeve in multiple successions, thereby attaining a redundant sealing relationship. However, one application of the process is normally sufficient. The process can in this context also be used for pipe couplings with branchings, having more than two support sleeves, since, what matters, is the application of the process to one support sleeve at a time.

The axial force application should preferably only be performed once a form-fitting connection between the engagement means and the pipe has been brought about, i.e. simultaneously with or after pressure deformation of the pipe.

The spring means does not have to be an additional component but can be brought about by the pipe itself in the course of pressure deformation of the pipe end by clamping a pipe section with the application of the axial force between the sealing means and a support means, provided in spaced apart relationship to the pipe end, and by providing the facility for radial expansion for the pipe on the side of the engagement means directed towards the pipe end. The clamping provides an axial force acting in the direction of the sealing means, in which context the pipe section, due to the facility to expand provided according to the invention, can yield in a flexibly resilient manner, preventing therefore a loss in mass on the pipe section. The spring action is therefore maintained to the extent intended, even during a change in temperature.

The abovementioned process is particularly suited for pure plastics pipes. This is so because the plastics material behaves in a particular way when the temperature increases, in as far as two opposing tendencies take effect. On the one hand, the material expands, bringing about a tendency to increase the axial force. However, on the other hand, the plastics material becomes soft at high temperatures with the tendency to decrease tension. On the whole, this results in a spring characteristic, preventing the formation of an excessive axial force at elevated temperatures, i.e. the axial force which initially increases because of the material expansion, is reduced again. This contributes to the fact that no material loss occurs beyond the engagement means.

Clamping is preferably performed in such a manner that the pipe is also put under pressure in the region of the support means in the direction towards the support sleeve by applying the axial force. The pressure deformation on both sides and the fixation of the pipe section by way of the engagement means and the support means causes the formation of a bulging pressure in the pipe section, resulting further in an arching of the pipe section with the formation of a spring action. In softer plastics pipes it is, moreover, advantageous if a wrap-around ring each is pushed over the pipe, at least in the region of the engagement means, and if the wrap-around ring(s) is/are likewise pressure deformed by plastic deformation.

The support means—just like the engagement means as well—may take the form of a tapered annular web so that it penetrates the pipe material during pressure deformation. It is, however, also possible to design the support means in such a manner that it acts from the end face of the pipe end. Examples of the different designs of support means are apparent from the embodiments illustrated in the drawings.

For pipes of little resiliency, such as for example composite pipes, rigid plastics pipes or metal pipes, it is advantageous to use an additional component to serve as the spring means and to bring the spring means into co-active engagement with the pipe after pushing the pipe onto the support sleeve by applying the axial force. This design allows composite pipes to have a substantially reduced wall thickness of the inner coating and to make it merely so thick as to render a form-fitting connection with the engagement means possible. In this context, contact with the aluminium pipe of the composite pipe should be avoided, so as to prevent intermetallic corrosion.

The active engagement between the spring means and the pipe can be performed in a multitude of manners, as shown by the working examples. It is particularly advantageous if the spring means, in order to bring about the co-active engagement, is pressure deformed, at least partly, in the direction of the support sleeve. This offers the advantage that sliding the pipe onto the pipe coupling can be performed without compression of the spring means. Only once the spring means has also been pressure deformed is the axial force applied, in which case pressure deformation may be performed in a single process step with pressure deforming the pipe for the purpose of bringing about the form-fitting connection, or it may be performed afterwards. The shape of the pressure jaw can ensure that pressure deformation of the spring means is not carried out too early. Pressure deformation of the spring means must, of course, be effected in such a manner as to still maintain its property as a spring, i.e. that it can yield resiliently.

Alternatively, a spring means is, however, also conceivable which comprises a pretensioned spring element and in which the spring element is released for the purpose of axial force application and this after the form-fitting connection between the pipe and the support sleeve has been brought about.

The action of the spring means may be performed from the end face of the pipe. It is, however, also possible to cause the spring means to act via the exterior or interior surface area of the pipe in that during and by the pressure deformation, a form-fitting connection between the spring means and the surface area is brought about. This is particularly advantageous for composite pipes, as in this manner intermetallic corrosion with metal parts of the spring means is avoided. Furthermore, it is not necessary to bring the pipe into contact with the spring means during insertion. This would involve considerable uncertainties. Precautions should, however, be taken that the pipe can expand towards the pipe end during an increase in temperature.

As regards the connection between the pipe and the pipe coupling, the object is attained in that at least one spring means is provided, deriving support from the pipe coupling by way of a support means, bringing about an axial force bearing on the sealing surfaces. As already described above with regard to the process according to the invention, this connection is characterised by reliable sealing with a long-term stability and by low manufacturing costs. Moreover, cavities are prevented, into which the fluid may seep.

In particular, in the case of pipes composed entirely of plastics, the spring means may take the form of a pipe section clamped between the engagement means and a support means, provided in spaced apart relationship towards the pipe end by applying the axial force and for which a space for radial expansion is provided. The pipe section may deform during temperature fluctuations because of the space for expansion provided according to the invention, so that its spring properties and thus also the axial force acting towards the sealing means, are maintained.

Clamping may be performed by pressure deforming the pipe even in the region of the support means in the direction towards the support sleeve, in which case advantageously pressure deforming is performed simultaneously in the region of the engagement means and the support means. In the process, the support means may likewise take the form of an engagement means—preferably as a mirror-image to the engagement means bringing about the form-fitting connection—, so that a form-fitting connection is brought about with the interior of the pipe. Alternatively, it may be provided that the support means takes the form of a support ring, from which the end face of the pipe end derives support after pressure deformation.

As already mentioned with regard to the process, the design of the spring means as an additional component, being in co-active engagement with the pipe while applying the axial force, is recommended for hard plastics pipes, composite pipes and metal pipes. The spring means ensures that even for that type of pipes an adequate axial force is applied under all intended operating conditions. In this context, in particular, at least one resilient tensioned spring element may be selected which is directly or indirectly connected to the pipe. This spring element may be a steel spring, for example in the form of a helical or disk spring, surrounding the support sleeve, or, alternatively, it may also be a plastics spring. Plastic elements, distributed over the circumference of the support sleeve may also be provided, instead of the plastics spring. The use of plastics for the spring element(s) has the advantage with regard to its spring characteristic, already mentioned further above, preventing the occurrence of an excessively high axial force at elevated temperatures. In the case of composite pipes, it is advantageous if the material of the plastics ring or plastics elements is identical with the plastics of the outer and inner coating of the composite pipe, i.e., in particular, crosslinked polyethylene.

Such a spring element is ideally tensioned by way of a pressure sleeve which has been plastically pressure deformed when bringing about the connection for the purpose of applying the axial force. In this process the pressure sleeve may extend over the pipe and may be pressed there onto the latter, preferably in the region of the engagement means bringing about the form-fitting relationship between the pipe and the support sleeve.

According to a further feature of the invention, provision is made for the interior surface area to comprise an axial support surface, directed towards the pipe end, onto which the spring means acts. The support surface is preferably moulded during pressure deformation to form a constriction, the spring element then extending into the pipe and being pressed onto the latter. This embodiment is suited primarily for metal pipes, in which case it is then advantageous to insert a sealing ring. One of the sealing surfaces may in this context be formed by the constriction while the other sealing surface may, for example, be designed as an annular web.

The spring means may, however, be designed as a spring sleeve as well, pressure deformed between the support at the pipe coupling and the pipe end, overlapping the pipe and pressure deformed with the pipe at that point as well.

The third part of the object according to the invention is characterised by a pipe coupling, wherein at least one spring means is provided, deriving support from the pipe coupling and adapted to be brought into co-active engagement with a pipe adapted to be pushed over the support sleeve. It is apparent from what is said further above how the spring means may be designed in detail. It is particularly advantageous, if the spring means is fitted to the pipe coupling in an axially immovable manner, thus forming part of the pipe coupling.

Figure 2:
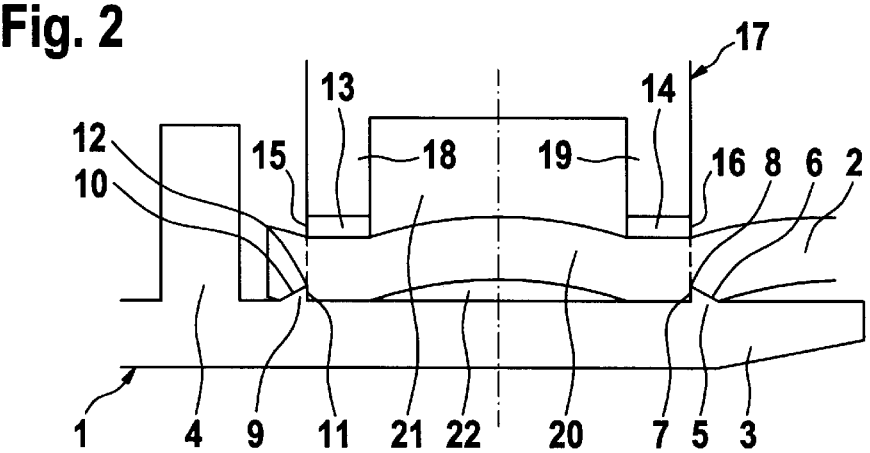
Figure 3:
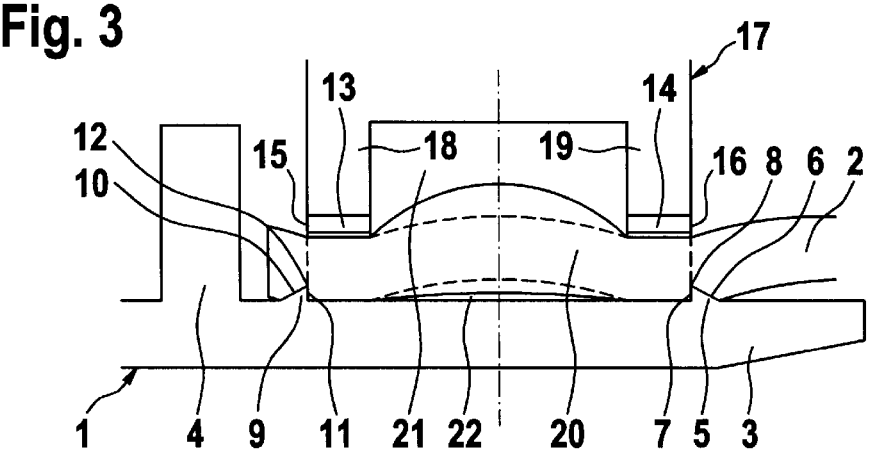
Figure 11:
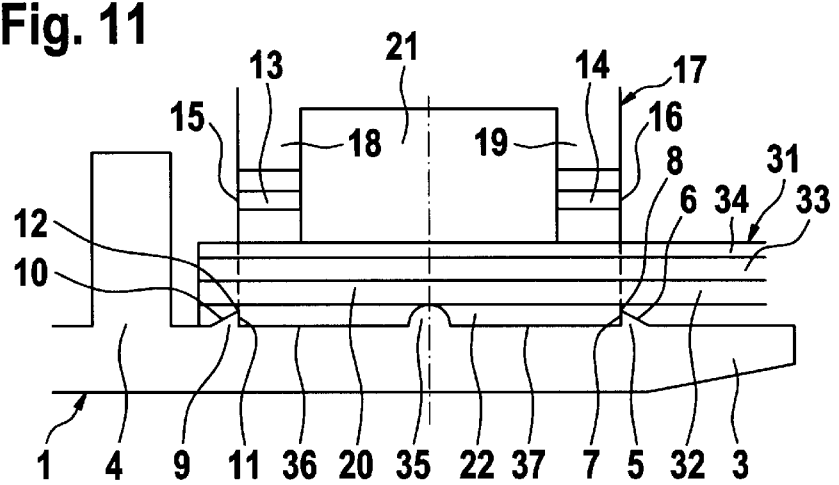
Figure 12:
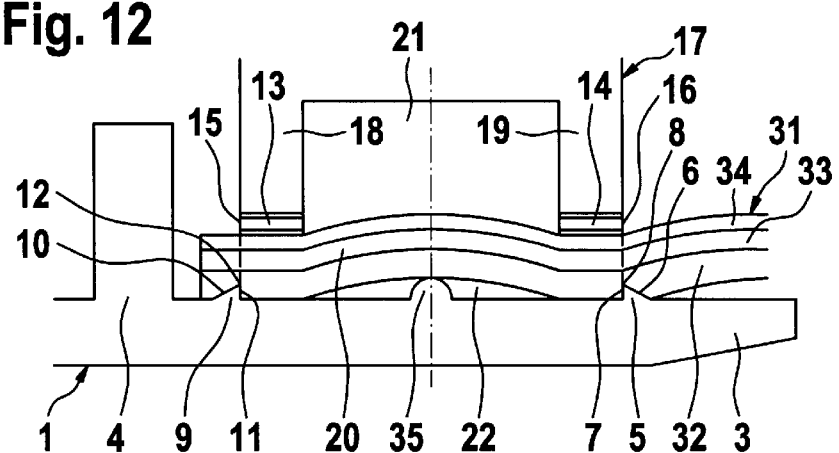
Figure 13:
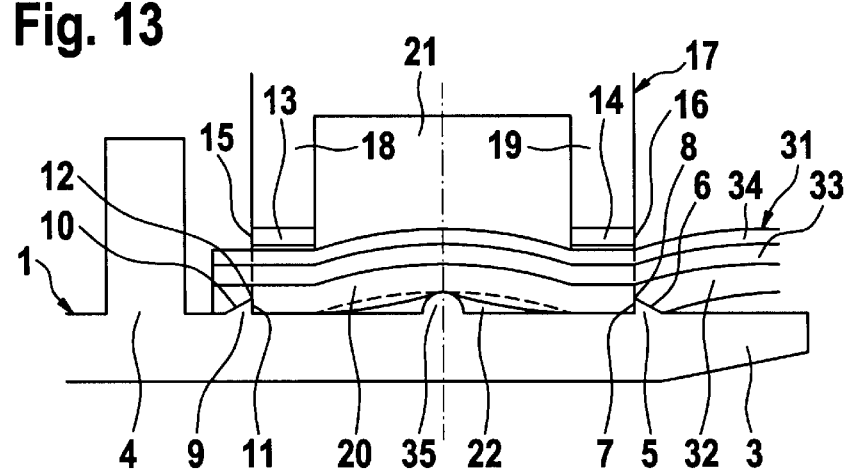
Figure 14:
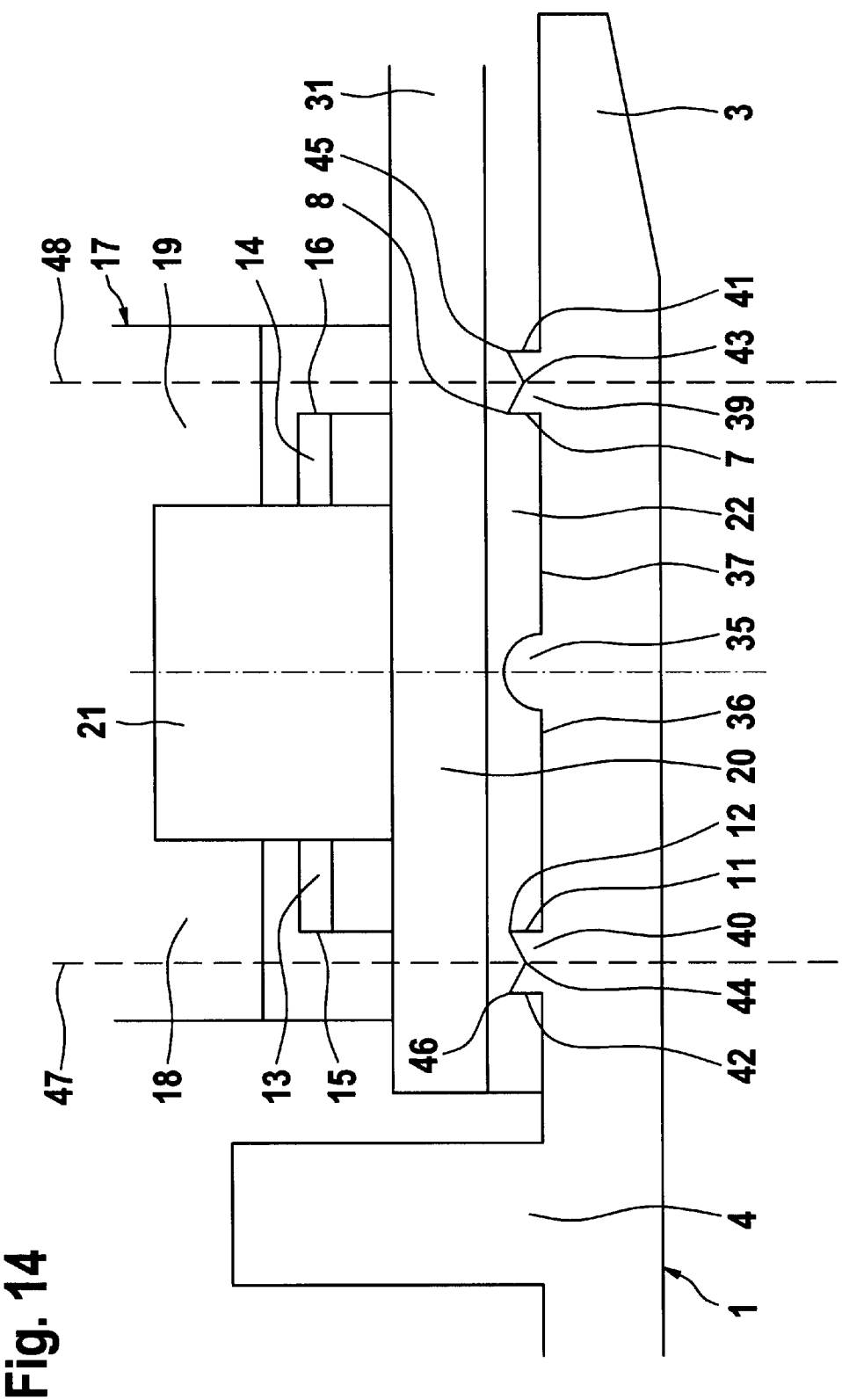
Figure 15:
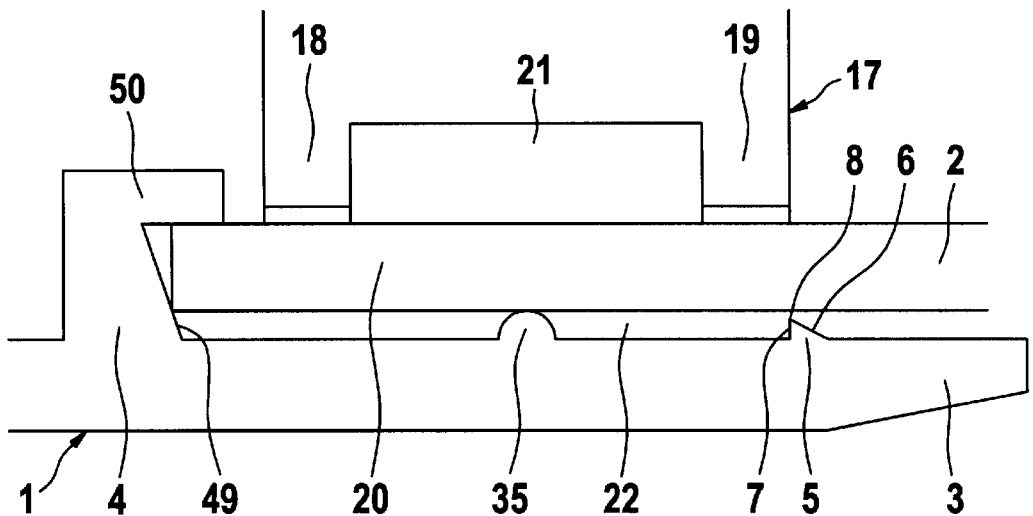
Figure 16:
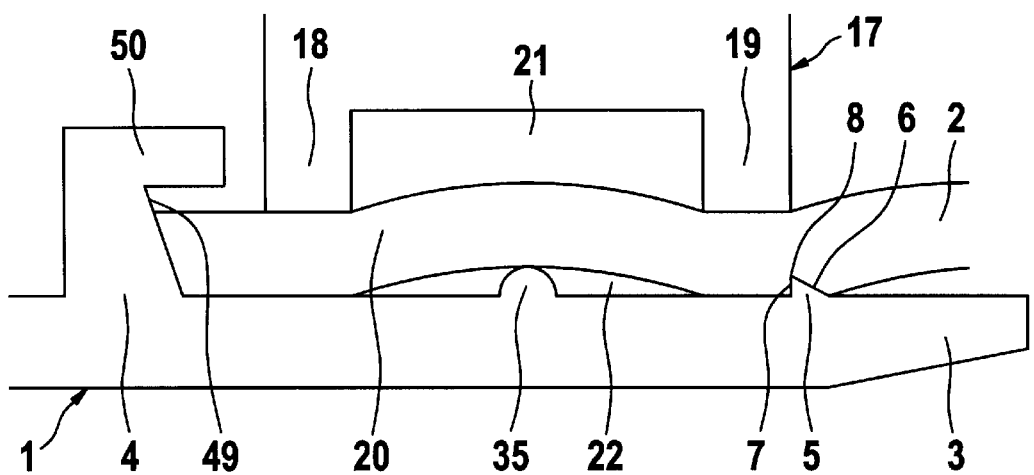
Figure 17:
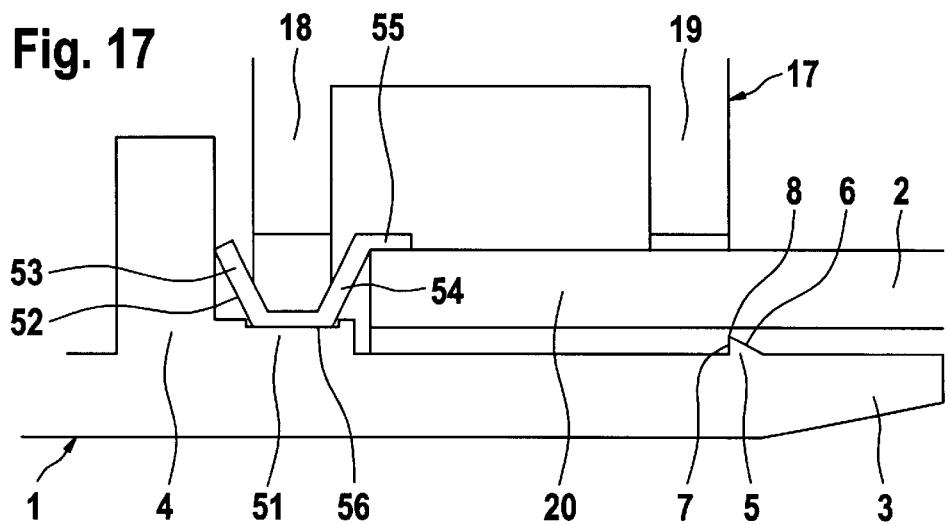
Figure 18:
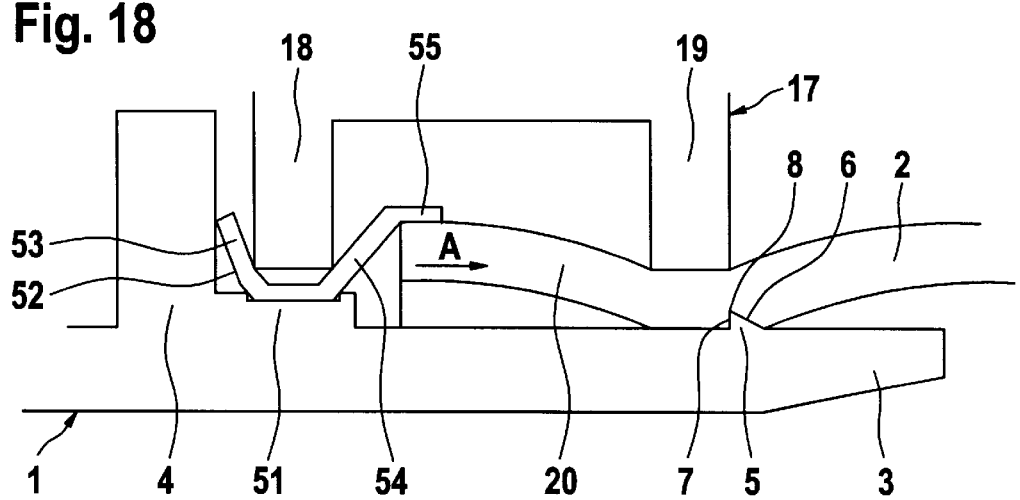
Figure 19:
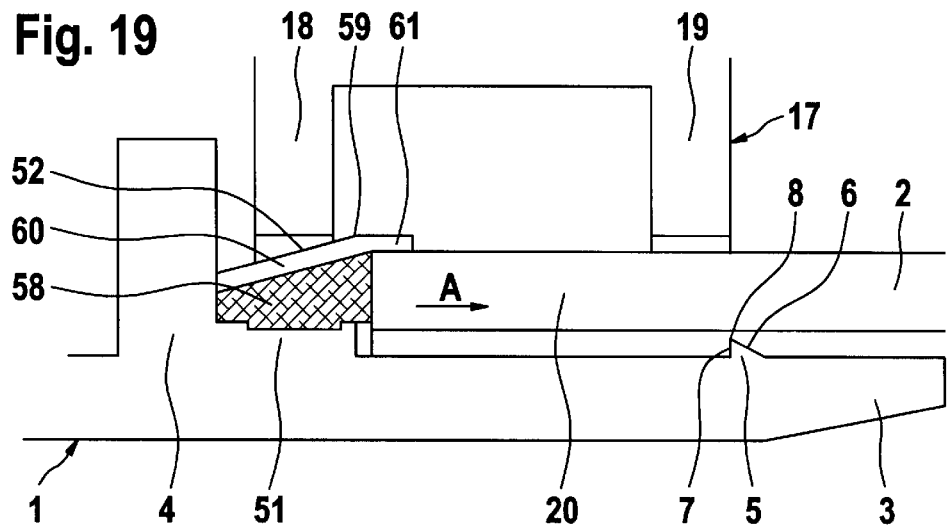
Figure 20:
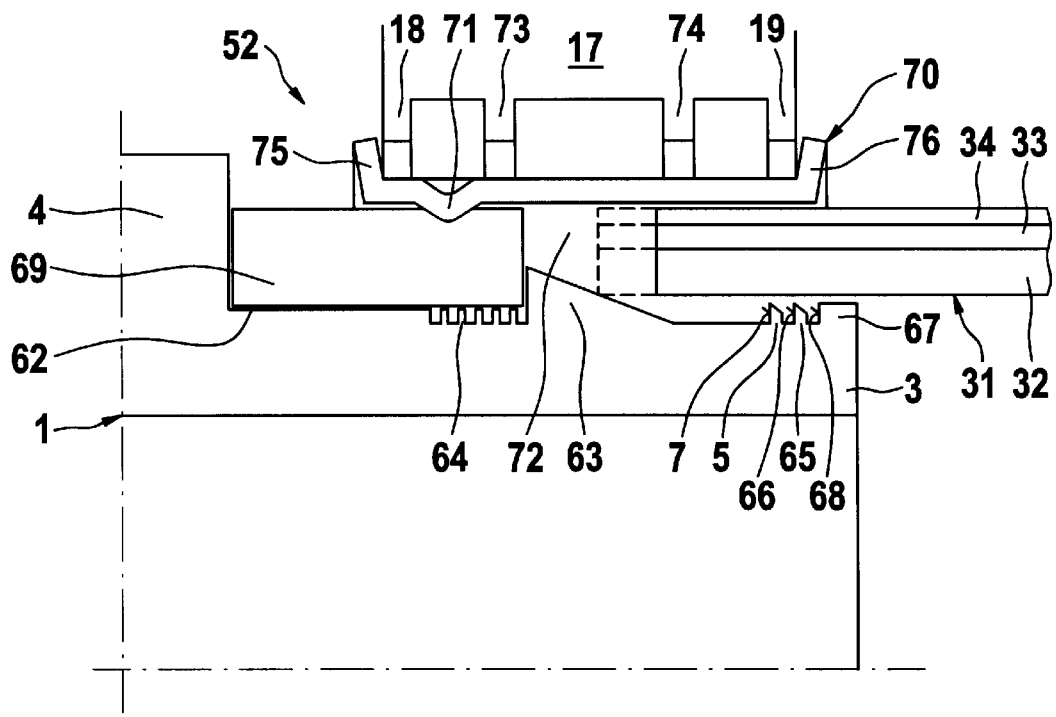
Figure 21:
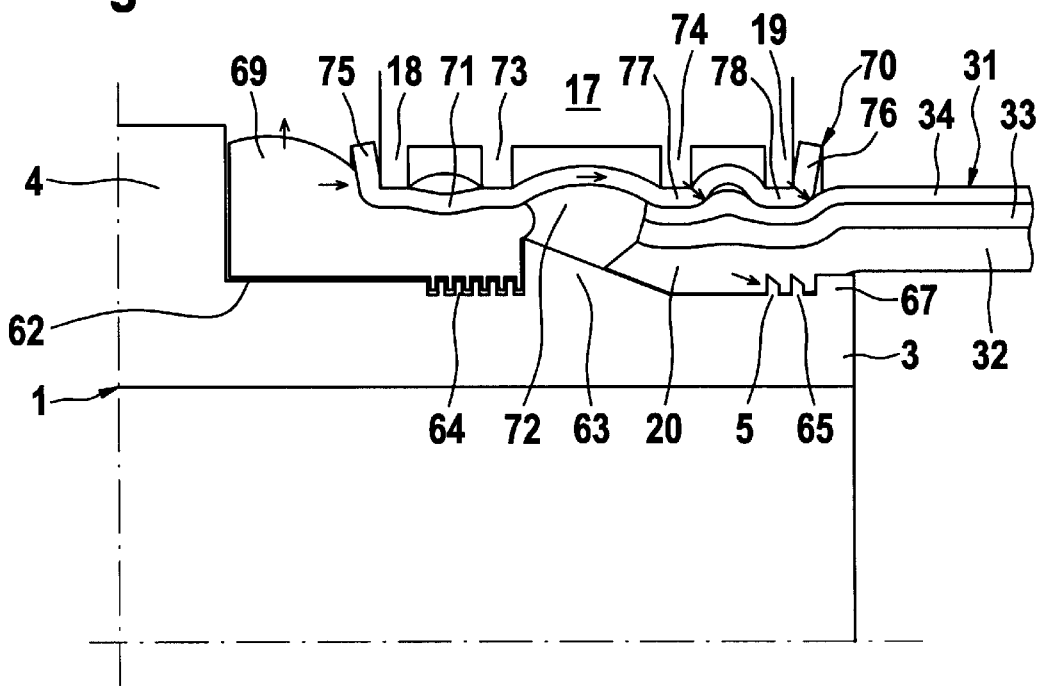
Figure 22:
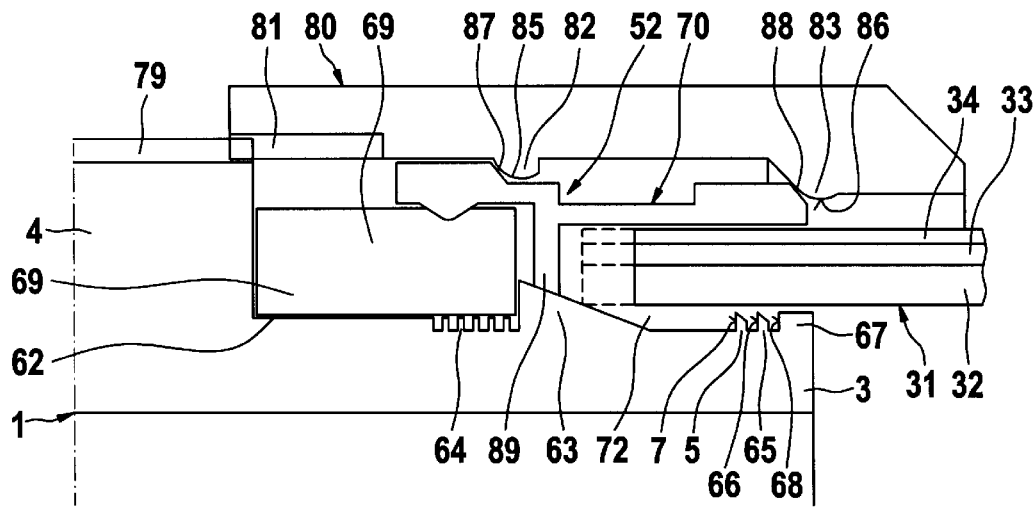
Figure 23:
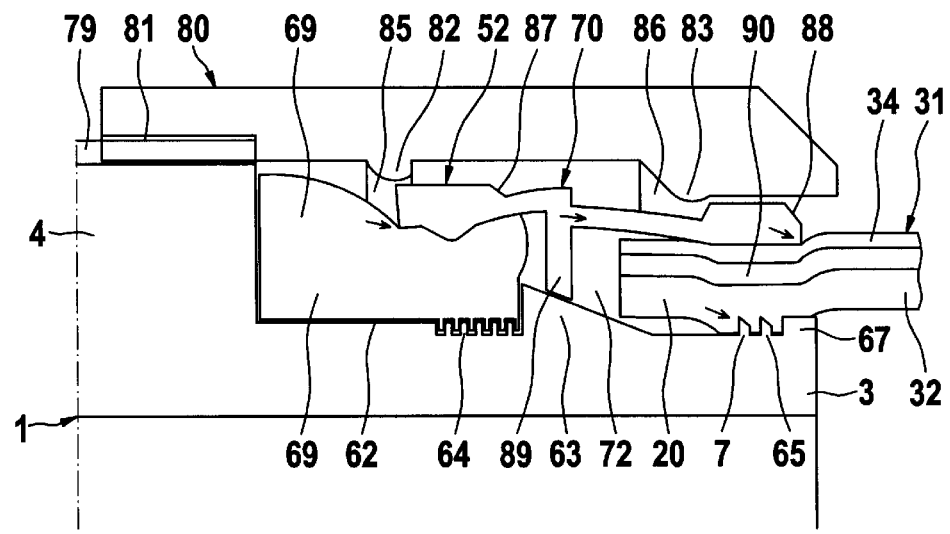
Figure 24:
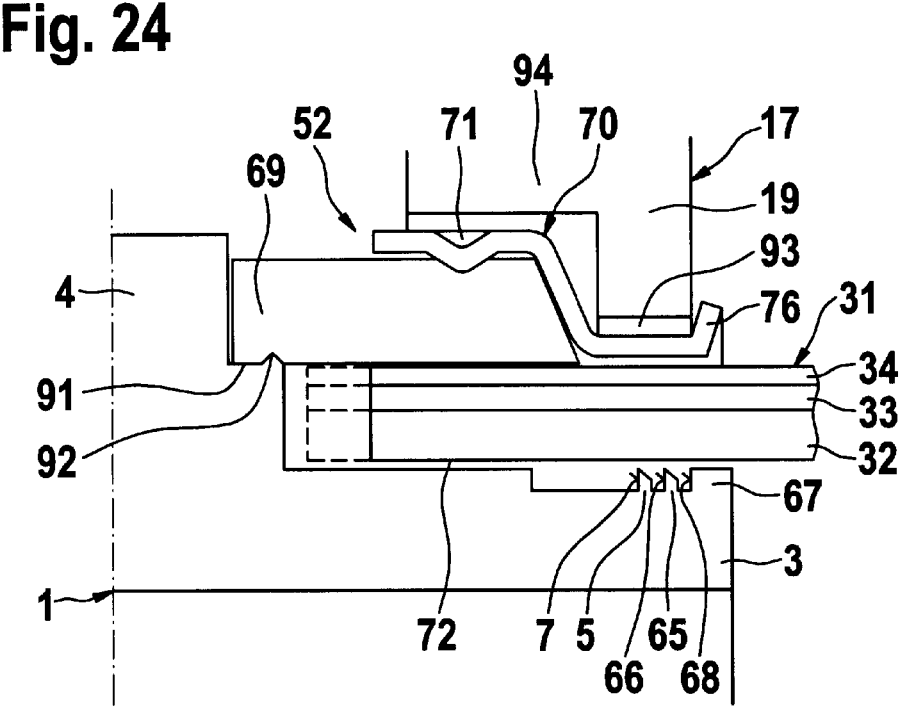
Figure 25:
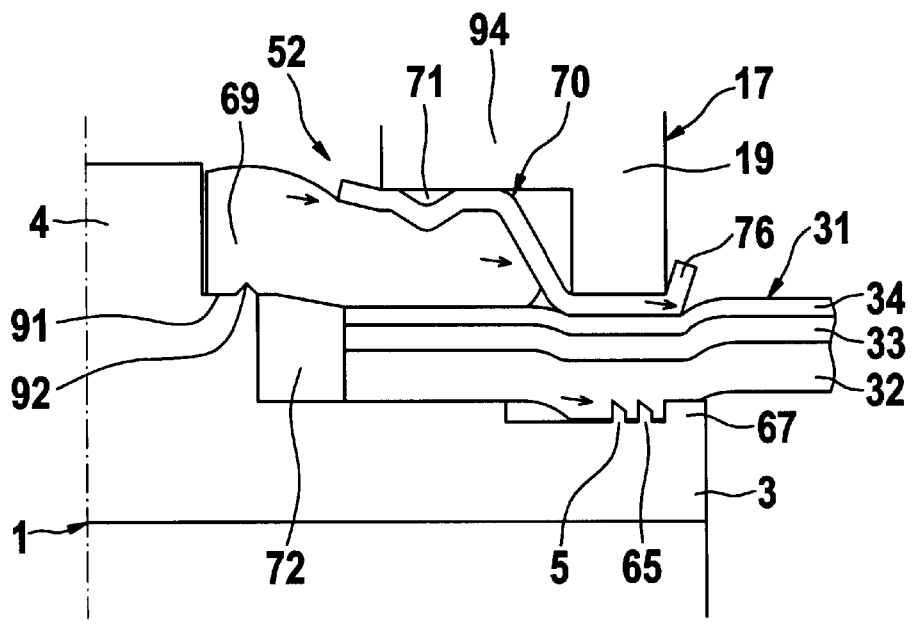
Figure 26:
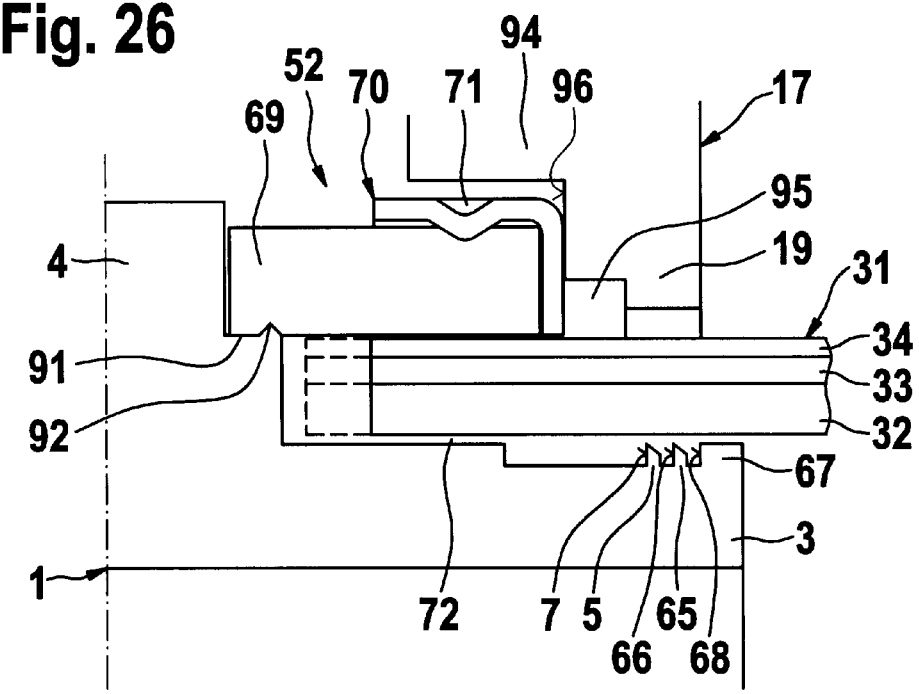
Figure 27:
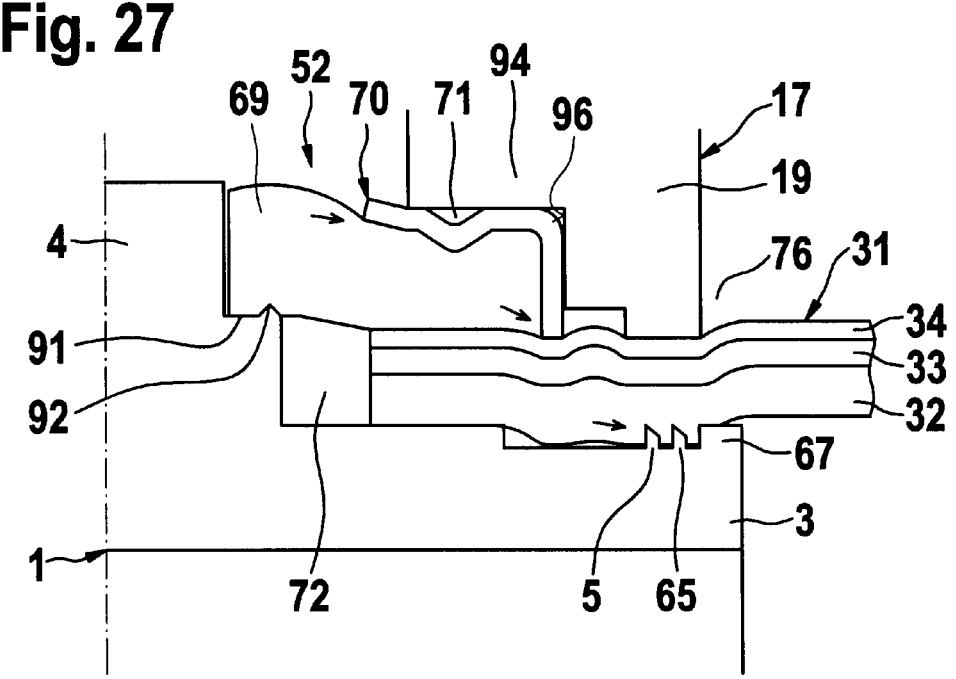
Figure 28:
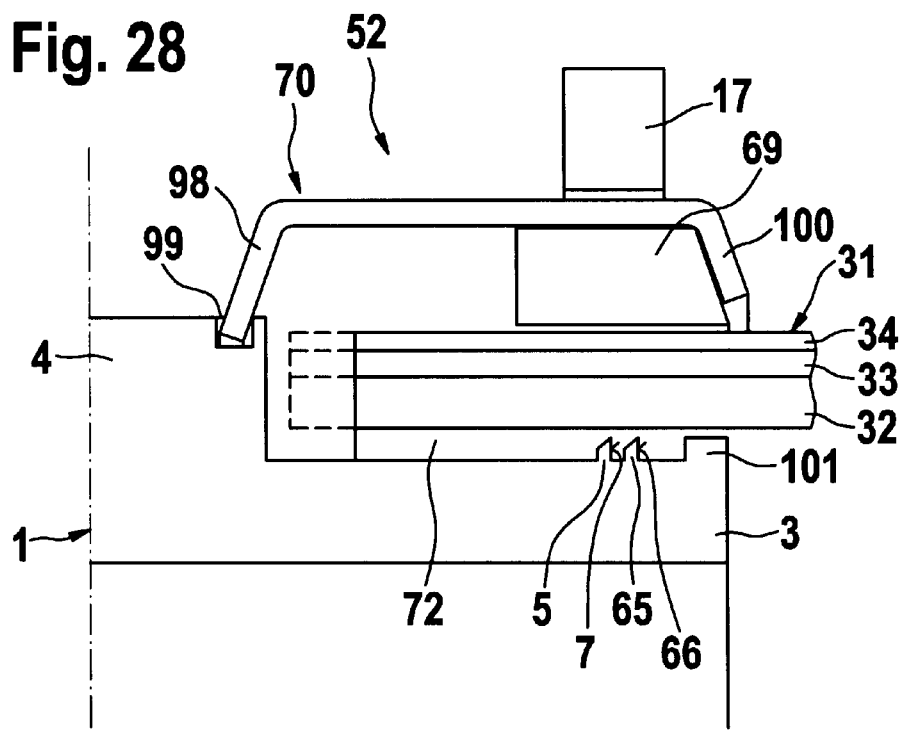
Figure 29:
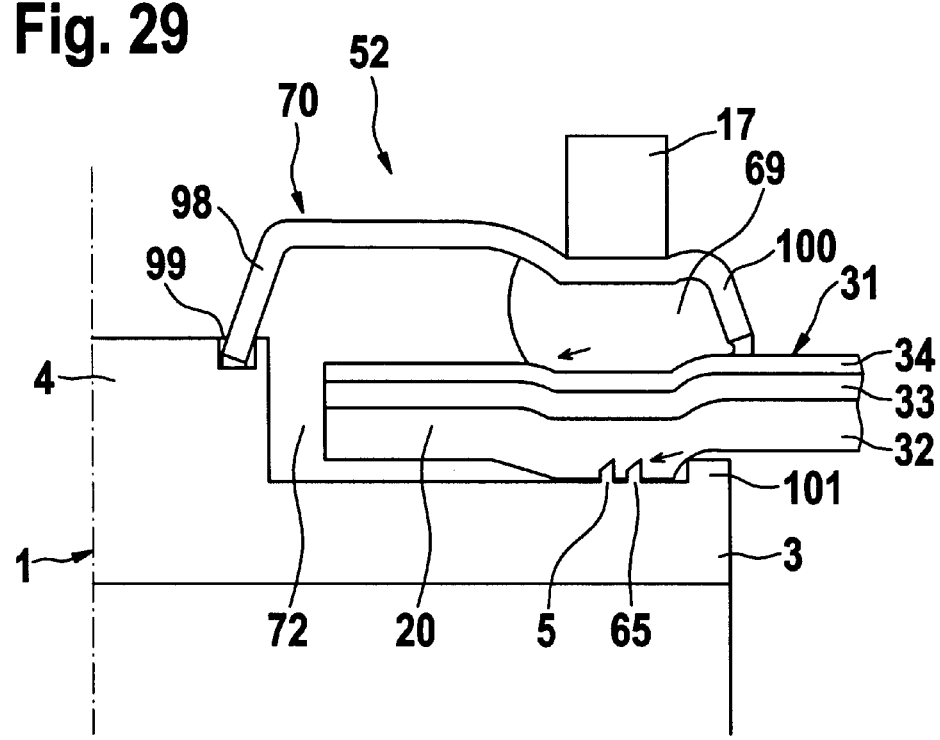
Figure 30:
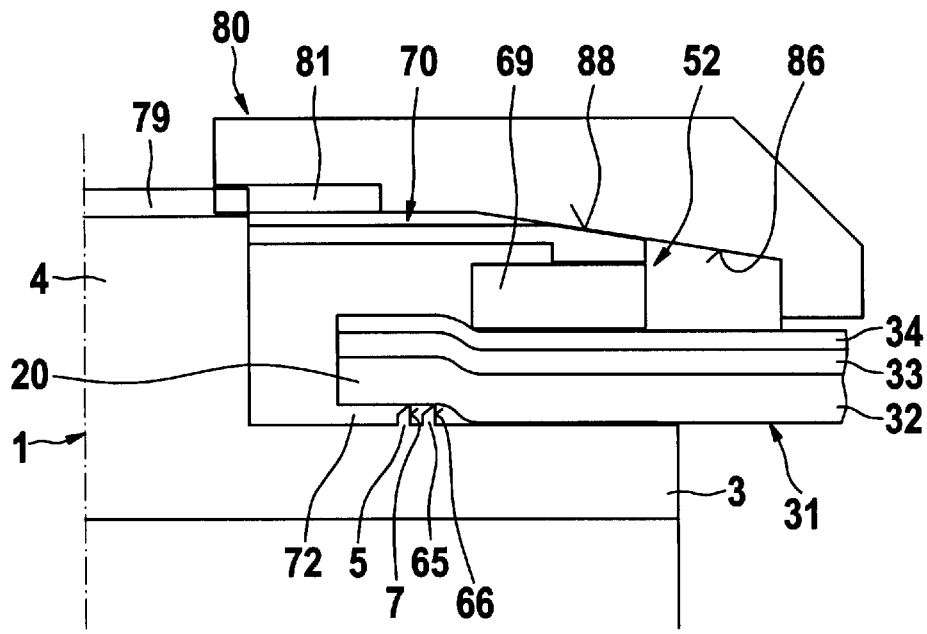
Figure 31:
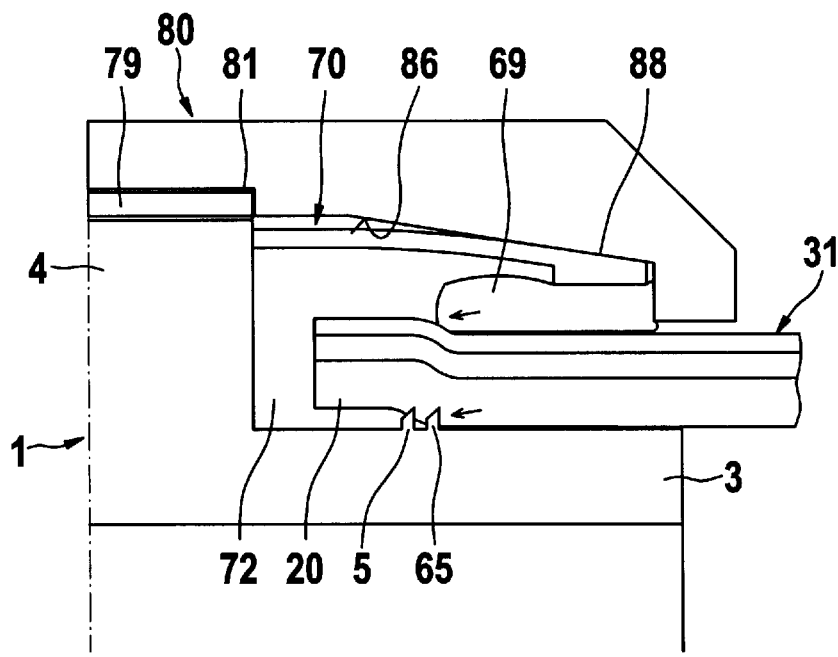
Figure 32:
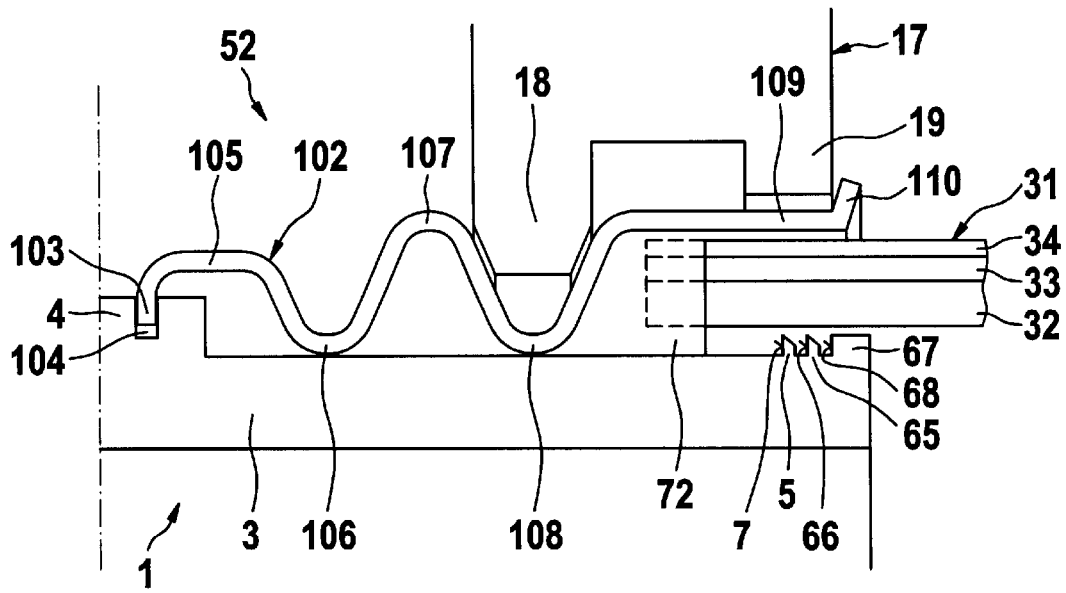
Figure 33:
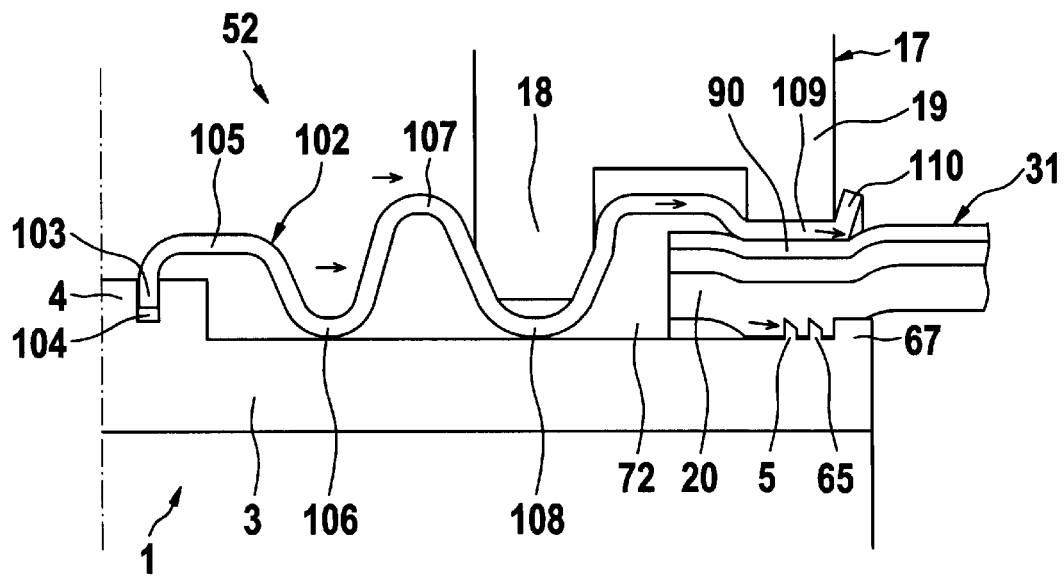
Figure 34:
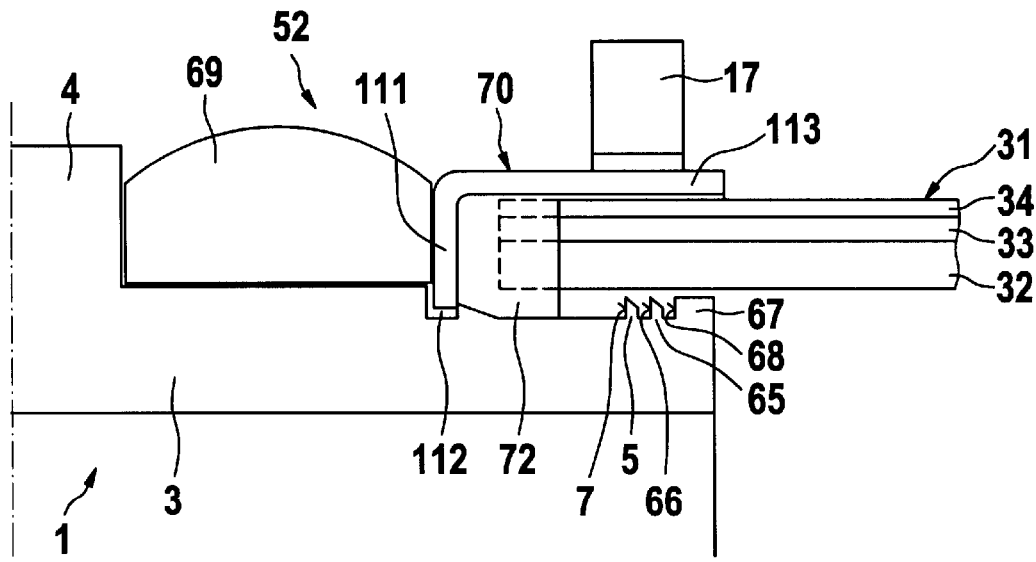
Figure 35:
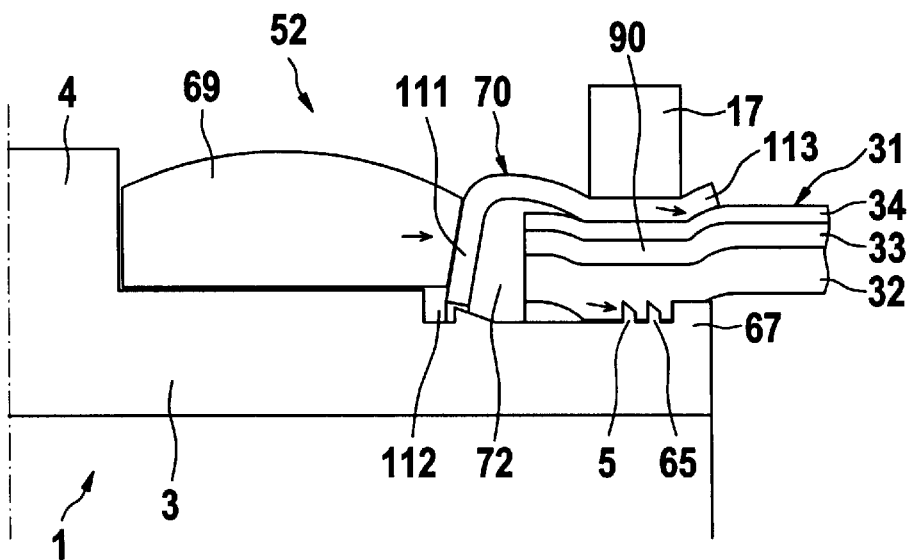
Figure 36:
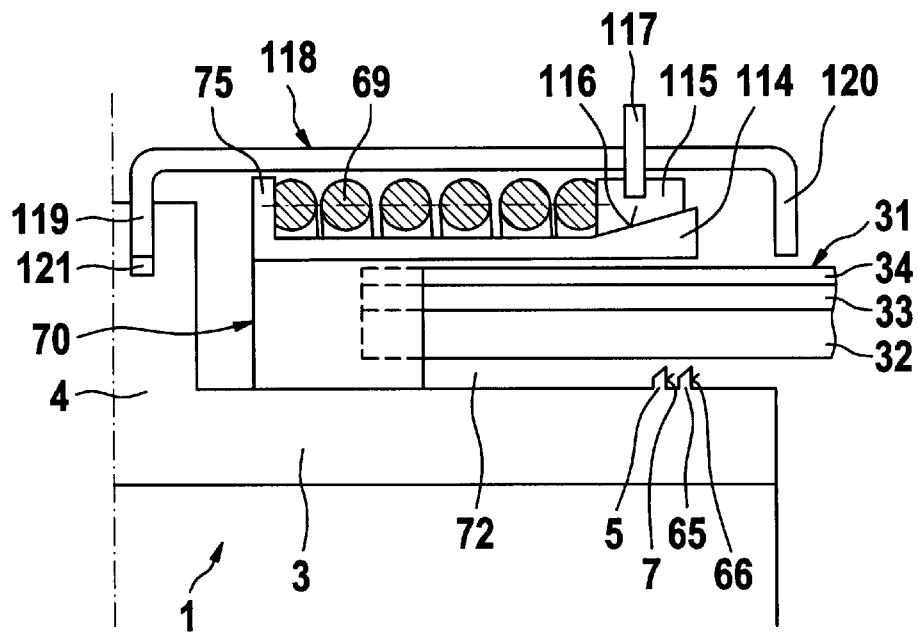
Figure 37:
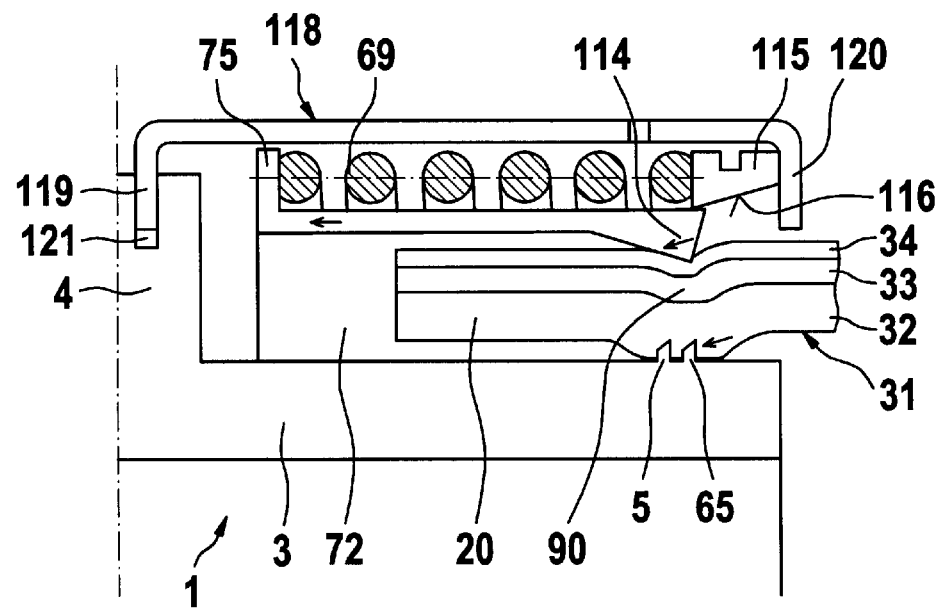
Figure 38:
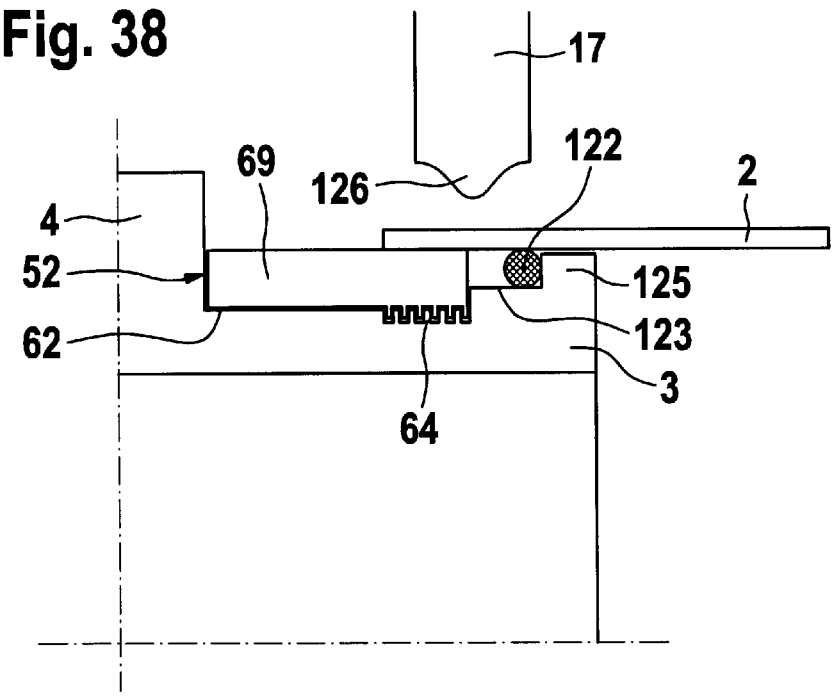
Figure 39:
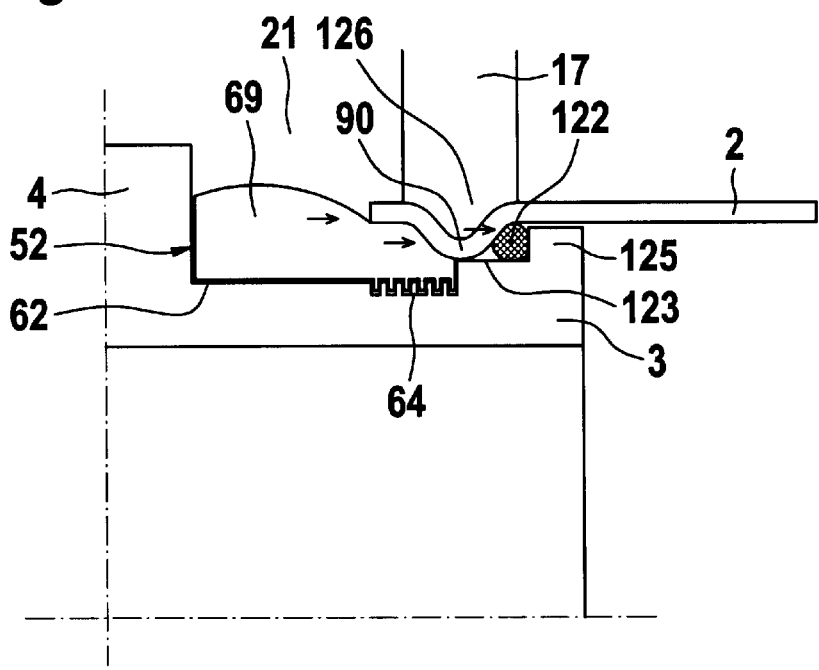

In the drawing the invention is elucidated in detail by way of working examples. There is shown in:

FIG. 1 a longitudinal section through the upper section of a first pipe coupling with a pipe, prior to pressure deformation;

FIG. 2 a view according to FIG. 1 after pressure deformation;

FIG. 3 a view according to FIGS. 1 and 2 during heating of the pipe;

FIGS. 4 to 10 different designs of pressure sleeves;

FIG. 11 a longitudinal section through the upper section of a second pipe coupling with a pipe, prior to pressure deformation;

FIG. 12 the view according to FIG. 11 after pressure deformation;

FIG. 13 the view according to FIGS. 11 and 12 during heating of the pipe;

FIG. 14 a longitudinal section through the upper section of a third pipe coupling with a pipe prior to pressure deformation;

FIG. 15 a longitudinal section through the upper section of a fourth pipe coupling with a pipe, prior to pressure deformation;

FIG. 16 the view according to FIG. 15 after pressure deformation;

FIG. 17 a longitudinal section through the upper section of a fifth pipe coupling with a pipe, prior to pressure deformation;

FIG. 18 the view according to FIG. 17 after pressure deformation;

FIG. 19 a longitudinal section through the supper section of a sixth pipe coupling with a pipe, prior to pressure deformation;

FIG. 20 a longitudinal section through the upper section of a seventh pipe coupling with a pipe, prior to pressure deformation;

FIG. 21 the view according to FIG. 20 after pressure deformation;

FIG. 22 a longitudinal section through the upper section of an eighth pipe coupling with a pipe, prior to pressure deformation;

FIG. 23 the view according to FIG. 22 after pressure deformation;

FIG. 24 a longitudinal section through the upper section of a ninth pipe coupling with a pipe, prior to pressure deformation;

FIG. 25 the view according to FIG. 24 after pressure deformation;

FIG. 26 a longitudinal section through the upper section of a tenth pipe coupling with a pipe, prior to pressure deformation;

FIG. 27 the view according to FIG. 26 after pressure deformation;

FIG. 28 a longitudinal section through the upper section of an eleventh pipe coupling with a pipe, prior to pressure deformation;

FIG. 29 the view according to FIG. 28 after pressure deformation;

FIG. 30 a longitudinal section through the upper section of a twelfth pipe coupling with a pipe, prior to pressure deformation;

FIG. 31 the view according to FIG. 30 after pressure deformation;

FIG. 32 a longitudinal section through the upper section of a thirteenth pipe coupling with a pipe, prior to pressure deformation;

FIG. 33 the view according to FIG. 32 after pressure deformation;

FIG. 34 a longitudinal section through the upper section of a fourteenth pipe coupling with a pipe, prior to pressure deformation;

FIG. 35 the view according to FIG. 34 after pressure deformation;

FIG. 36 a longitudinal section through the upper section of a fifteenth pipe coupling with a pipe, prior to pressure deformation;

FIG. 37 the view according to FIG. 36 after pressure deformation;

FIG. 38 a longitudinal section through the upper section of a sixteenth pipe coupling with a pipe, prior to pressure deformation and FIG. 39 the view according to FIG. 38 after pressure deformation.

In the following description of the different embodiments, identical parts or parts performing the same function, are denoted by the same reference numbers. To the extent that in an individual case reference numbers indicated in the respective figure are not explained in the associated descriptive part, reference is made to preceding explanations regarding this reference numeral.

FIGS. 1 to 3 show the process of connection between the right-hand section of a first pipe coupling 1 and the terminal region of a pipe 2. In this context the upper half of each is illustrated. The lower half has been omitted as the pipe coupling 1—just like all pipe couplings shown here—and also the pipe 2, are rotation-symmetrical.

The pipe coupling 1 has a right-hand side support sleeve 3 with a circular crosssection. It is moulded onto a central portion 4 of the pipe coupling 1 and is composed of metal or plastics, suitable for the respective purpose of application.

Adjacent to the free end of the support sleeve 3, a sealing web 5 of triangular cross-section projects outwardly, annularly passing around the support sleeve 3. Towards the free end of the support sleeve 3 it has a conical slant 6 while towards the central portion 4 it comprises a sealing surface 7, extending vertically about the axis of the support sleeve 3. The sealing surface 7 and the conical slant 6 converge into a sharp edge 8.

Adjoining the central portion 4, the support sleeve 3 has a support web 9 on the outside, which is designed in a mirror-image like manner to the sealing web 5, i.e. it comprises a conical slant 10 towards the central portion 4 and a vertical abutment surface 11 oriented towards the sealing web 5. Both meet in a sharp edge 12.

Above the support sleeve 3 the pipe 2 has been pushed close to the central portion 4. The pipe 2 is in this case composed of plastics material, for example crosslinked polyethylene or polypropylene. In the original state, the pipe interior is spaced from the edges 8, 12 of the sealing web 5 or, as the case may be, the support web 9. On the outside the pipe 2 is surrounded by two wrap-around rings 13, 14. They are arranged in such a manner that their end faces 15, 16, which each face away from one another, are flush with the sealing or abutment surfaces 7 or 11.

The wrap-around rings 13, 14 are surrounded by a schematically illustrated jaw of a pressing device, differing from the pressing devices normally employed for bringing about such pipe connections merely by the specific shape of the jaw 17 on its inside. This configuration is characterised in that the jaw 17 comprises two pressing webs 18, 19 provided in spaced apart relationship, having the width of and being arranged like the wrap-around rings 13, 14, so that the action of the jaw 17 onto the wrap-around rings 13, 14 remains limited. The outer edges of the pressing webs 18, 19 are accordingly flush with the end faces 15, 16 of the wrap-around rings 13, 14 and consequently with the abutment surfaces 7, 11 as well.

Starting from the situation illustrated in FIG. 1, pressure deformation is performed by the movement of the jaw 17 radially towards the interior. The jaw 17 is semicircular, for which reason a further, likewise semi-circular jaw, not illustrated here, is provided. In a conventional manner the two jaws 17 are moved towards one another radially towards the interior, including in their end position a closed pressing space. By the movement of the jaw 17, the wrap-around rings 13, 14 are plastically deformed radially towards the interior. In the further course the pipe 2, in the region of the two wrap-around rings 13, 14 is constricted as well by plastic deformation. In the process, a material flow occurs in axial direction, that is to say in both directions, by changing the wall thickness of the pipe 2. Between the two wrap-around rings 13, 14 this creates a pipe section of the pipe 2, remaining in the radial movement, so that—as can be seen from FIG. 2—a radial, outwardly directed arching of the pipe section 20 comes about. Embedding the sealing web 5 and the support web 9 in the pipe 2 results in that the material flow away from the pipe section 20 is prevented. As the pipe material seeks the path of the least resistance, the pipe material displaced during the continuation of compressive deformation now flows exclusively into the pipe section 20, where it brings about a sealing relationship. The pipe section 20 is axially bulged, thereby forming a compressed pressure spring. The final state is shown in FIG. 2, from which it is apparent that the sealing web 5 and the support web 9 are entirely sunk into the material of the pipe 2 and that the pipe section 20, due to non-action of the jaw 17 and material displacement in the region of the wrap-around rings 13, 14, has acquired a radial arching. In this context the bulged pipe section 20 exerts an axial force onto the sealing surface 7 of the sealing web 5 and onto the abutment surface 11 of the support web 9, the sealing surface 7 of the sealing web 5 acting as a seal towards the fluid side.

FIG. 3 shows the change of shape of the pipe 2 during heating, the arching according to FIG. 2 being illustrated in dashed lines. As the pipe section 20 is tightly clamped between the sealing web 5, the support web 9 and the wrap-around rings 13, 14, there is no material flow from the pipe section 20. The expansion and flow of the plastics remains limited to the pipe section 20, in which case the pipe section 20 expands between the wrap-around rings 13, 14 both radially outwardly and radially inwardly. As clearances for expansion 21, 22 are provided there, the expansion movement and thus the spring action of the pipe section 20 is not impaired and the sealing action, in particular on the sealing surface 7, is not interfered with.

During cooling, the plastics material contracts again, the pipe section 20 once again resuming its configuration illustrated in FIG. 2. In this case as well, the sealing relationship in the region of the sealing surface 7 and the abutment surface 11 is maintained. In this context, sealing on the sealing surface 7 of the sealing web 5 is completely adequate for attaining the desired sealing action.

Figure 4:
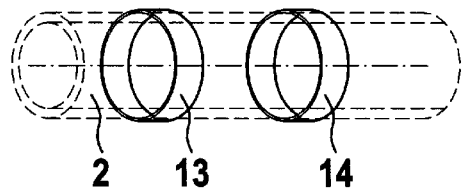
Figure 5:
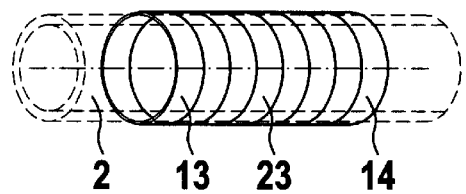

FIGS. 4 to 10 show different embodiments of the design of wrap-around rings, the pipe 2, to the extent that it is shown in a perspective view, being indicated merely by dashed lines. FIG. 4 shows the wrap-around rings 13, 14, known from FIGS. 1 to 3. For a better handling of these wrap-around rings 13, 14 they are interconnected by way of a deformable plastics sleeve 23 which does not impede the radial arching in outward direction of the intermediate section 20. In the working example according to FIG. 6, the two wrap-around rings 13, 14 are coupled to one another by way of two flexible plastics webs 24, 25, which likewise cannot impair the expansion of the intermediate section 20.

Figure 7:
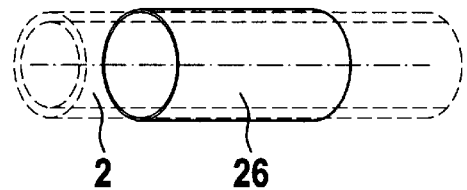
Figure 8:
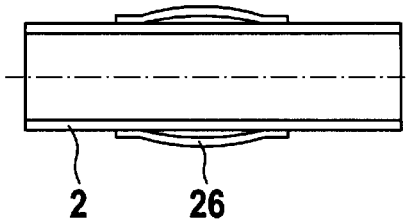

The embodiments according to FIGS. 7 and 8 resemble one another to the extent that in this case, instead of two separate wrap-around rings, a continuous metal pressure sleeve 26 is used, which is, however, pressure deformed only in the outer regions according to the process resulting from FIGS. 1 to 3 so that the intermediate sections virtually maintain their diameter, providing therefore a clearance for expansion 21 for the arching of the intermediate section 20. This can be further promoted, as is apparent from FIG. 8, by a bulging of the pressure sleeve 26 itself.

Figure 9:
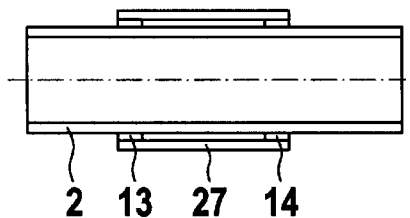

Similar effects can be attained by the embodiment according to FIG. 9. In this instance, the wrap-around rings 13, 14 are connected by an outwardly overlapping sleeve 27 so that here as well an adequate free space for expansion can be provided.

Figure 10:
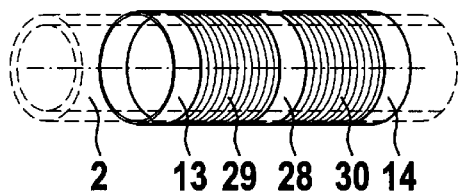
Figure 6:
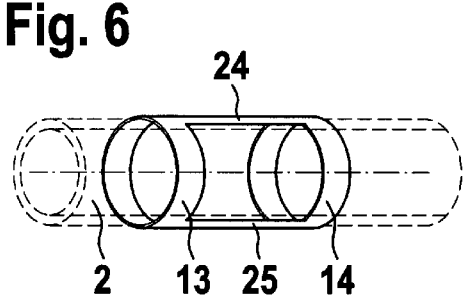

A particular embodiment is shown in FIG. 10. In this case, a central ring 28 is provided between the two wrap-around rings 13, 14, connected to the wrap-around rings 13, 14 by way of plastic sleeves 29, 30, so that a manageable unit is provided. The central ring 28 merely serves as a limiting ring. It is true that it does not participate in the pressure deformation so that its diameter is not reduced during pressure deformation. Its purpose is to prevent a bulging of the intermediate section 20 of the pipe 2 beyond a pre-determined dimension so that no pipe fracture will occur there.

The views according to FIGS. 11 to 13 differ from those according to FIGS. 1 to 3 essentially only to the extent that, instead of a pipe 2, composed entirely of plastics, in this instance a composite pipe 31 is connected to the pipe coupling 1. The composite pipe 31 is composed of three layers. On the inside it comprises a plastics layer 32, in the middle an aluminium pipe 33 and on the outside a protective layer 34, likewise made of plastics.

The pipe coupling 1 differs from that according to FIGS. 1 to 3 only in that in the centre between the sealing web 5 and the support web 9 a support rib 35 is formed, semi-circular in cross-section and annularly surrounding the support sleeve 3 on the outside, in which context, besides the support rib 35, —optionally—flat annular grooves 36, 37 may be provided, enlarging the free space for expansion 22 between the composite pipe 31 and the support sleeve 3. Otherwise, with regard to the reference numerals entered in FIGS. 11 to 13, reference is made to the description of FIGS. 1 to 3, unless elucidated in more detail in the present example.

During pressure deformation of the composite pipe 31 from the position shown in FIG. 11 into the position according to FIG. 12, the aluminium pipe 33 is likewise deformed. However, it puts up a certain resistance against the above-described displacement of the plastics of the interior plastics layer 32 so that for this material a free space for expansion 22 is provided between the interior of the composite pipe 31 and the exterior of the support sleeve 3. In this case a support rib 35 promotes the formation of a free space for expansion 22, as it prevents the plastics layer 32 from bearing completely against the support sleeve 34. It can be seen from FIG. 2 that this causes, besides the support rib 35, the formation of an adequate free space for expansion 22. Should this be inadequate in a particular case, the free space for expansion 22 can be enlarged by moulding on the already mentioned annular grooves 36, 37.

FIG. 12 shows the configuration of the composite pipe 31 after pressure deformation at the pressing temperature, i.e. at ambient temperature. If a hot medium flows through the composite pipe 31, thermal expansion of the composite pipe 31 takes place and here, in particular, of the plastics layer 32 and of the protective layer 34. As the material of the plastic layer 32 is prevented from flowing to the outside by the sealing web 5 and the support web 9, it will expand inwardly—following the path of least resistance—, i.e. the free space for expansion 22 fills with the material of the plastics layer 32. At the same time, the spring action of this layer and therefore the pressure force on the sealing surface 7 and the abutment surface 11 are maintained, i.e. the sealing action of the connection between the pipe coupling 1 and the composite pipe 31 is not impaired.

FIG. 14 shows an embodiment differing only in the following respects from that according to FIGS. 11 to 13, so that, in addition, reference is made to that description. The pipe coupling 1, in this case, comprises a sealing web 39 and a support web 40, which are both provided at the same respective locations as the sealing web 5 or the support web 9, respectively, in the working examples according to FIGS. 1 to 3 and 11 to 13, but having a different configuration. The sealing web 39 and the support web 40 do not only comprise sealing or abutting surfaces 7, 11 on the sides facing one another, but also comprise sealing or abutting surfaces 41, 42 on the sides facing away from one another. Between the respective, associated sealing or abutting surfaces 7, 41, on the one hand, and 11, 42, on the other, an annular groove 43, 44 is formed, directed towards the composite pipe 31, in each case having a wedge-like cross-section. Because of this, not only the edges 8, already known from the afore-described embodiments are formed on the sealing surfaces or abutting surfaces 7, 11, facing one another, but, additionally, also outwardly positioned edges 45, 46. Instead of the illustrated wedge shape, a wedge form, for example, with rounded off edges may be provided or the web, which defines the groove shape, may be rectangular or the like.

A further difference from the embodiments according to FIGS. 1 to 3 and 11 to 13 resides in that the jaw 17 is in each case widened towards the exterior so that its external sides are flush with the exterior sealing or abutting surfaces 41, 42.

Here as well, the sealing web 39 and the support web 40 penetrate completely into the plastics material of the composite pipe 31 during pressure deformation. The lines 47, 48 symbolise in this context the limits of the material flow from the outside towards the inside. The sealing or abutting surfaces 41, 42 prevent a material flow into the pipe section 20 if pressure forces act on the composite pipe 31 in the direction towards the central portion 4 of the pipe coupling 1. Even during this force application the mass of the pipe section 20 remains constant, thus providing clear conditions for sealing, in particular also under the influence of heat. It stands to reason that this design can be employed and is useful also for pipes made of plastics only.

In the embodiment according to FIGS. 15 and 16, the central portion 4 of the pipe coupling 1 comprises a conical surface 49 including an obtuse angle with the outside of the support sleeve 3. At the free end an axially projecting annular web 50 is moulded to the central portion 4. Apart from that, the support sleeve 3, in this case as well, comprises a sealing web 5 of the configuration already described, the sealing surface 7 of which is flush with the outside of the jaw 17. In addition, a support rib 35 is provided between the sealing web 5 and the conical surface 49.

At the beginning of the pressure deformation procedure the pipe 2 is pushed on via the support sleeve 3 until abutment against the conical surface 49, the annular web 50 having a centring action on the pipe 2. During pressure deformation the end of the pipe 2 slides down onto the conical surface 49 and is thereby displaced in an axial direction. In the further course the sealing web 5 penetrates into the material of the pipe 2 because of its contraction there, preventing the axial movement of the pipe 2. By the further pressure deformation of the end of the pipe 2 radially inwardly, a bulging pressure or an axial force now occurs by way of the conical surface 49, being absorbed by the sealing surface 7 of the sealing web 5. Supported by the support rib 35, the pipe section 20 bulges in arcuate fashion towards the outside, a free space for expansion 22 being formed on both sides of the support rib 35. This is made available for a volume increase of the pipe 2 due to heating, ensuring the spring action of the pipe section 20.

It stands to reason that this embodiment can be used also in the case of pipes 2 of a softer plastics material, provided additional wraparound rings, 13, 14, as in the working example according to FIGS. 1 to 3, are employed, keeping the pipe 2 in the pressure deformed position.

In the preceding embodiments the pipe section 20 constituted the spring for applying an axial force towards the sealing web 5 and its sealing surface 7. In the following embodiments particular spring means are provided bringing about the application of the axial force. These embodiments are suited in particular for "hard" pipes and are, therefore, considered primarily for composite pipes or pure metal pipes.

In the embodiment according to FIGS. 17 and 18 the pipe coupling 1 comprises a sealing web 5 which is designed in the same manner as in the aforedescribed embodiments. However, one support web 9 is missing. Behind the end of the pipe 2, the support sleeve 3 comprises a shoulder 51, whereon a spring means 52 is positioned. The spring means 52 is designed as an ondular spring having a V-shaped cross-section with limbs 53, 54 which open outwardly, a horizontal web 55, moulded to the limb 54 on the side of the pipe, engaging around the outer edge of the pipe 2 and abutting on its outside. The ondular spring is composed of a plastically deformable metal, e.g. steel. A groove 56 on the shoulder 51 gives the spring means 52 a certain support in axial direction.

If the spring means 52 and the pipe 2 are pushed onto the support sleeve 3, as is apparent from FIG. 17, the jaw 17 is moved radially inwardly for introducing the pressure deformation process. During this process two things happen substantially simultaneously. On the one hand, the pipe 2 is constricted by the pressing web 19 in the region of the blocking web 5 by plastic deformation, in which context the sealing web 5 penetrates into the material of the pipe 2 bringing about there a kind of form-fitting abutment against material flow towards the fluid side. The pressing web 18 on the left hand side enters between the limbs 53, 54, expanding them. As the spring means 52 takes support on the central portion 4 by way of the left limb 53, an axial force is exerted on the pipe section 20 by way of the limb 54 in the direction of the arrow A and therefore in the direction towards the sealing surface 7 of the sealing web 5, providing there a seal-forming abutment. In the process, the spring means 52 is plastically expanded, retaining, however, its spring characteristic, i.e. even after pressure deformation and thus after attainment of the state according to FIG. 18, an axial pressure is exerted on the pipe section 20 of the pipe 2 in the direction of arrow A. During heating of the pipe 2, the change in length of the pipe section 20 is absorbed by the elastic resilience of the spring means 52. The pressure force on the sealing surface 7 of the sealing web 5 and therefore its sealing action are maintained even then.

The embodiment according to FIG. 19 differs from that according to FIGS. 17 and 18 merely by a different design of the spring means 52 for applying the axial force. In this instance, it comprises an elastomer ring 58 bearing on the end face of the pipe 2. It is surrounded by a metal ring 59, comprising a limb 60, obliquely sloping towards the central portion 4 and comprising an axial limb 61, bearing against the outside of the pipe 2. With pressure deformation and, therefore, with the radial movement of the jaw 17 in downward direction, an axial bulging pressure on the pipe section 20 comes about in that the left-hand pressing web 18 loads the oblique limb 60, therefore moving the elastomer ring 58 in the direction of the arrow A, so that it exerts a bulging pressure via the end face of the pipe 2, i.e. it exerts an axial force on the sealing surface 7. It is absorbed by the sealing web 5 in the same manner as described for FIGS. 17 and 18.

In both cases the right-hand pressing web 19 may also be so designed as to project radially further inwardly than the left-hand pressing web 18 so that a form-fitting relationship with the sealing web 15 is performed chronologically prior to charging the spring ring 52, 57, respectively. In this manner a premature axial displacement of the pipe 2 is prevented.

In the embodiment according to FIGS. 20 and 21, the pipe coupling 1 comprises a support sleeve 3 which, on its circumference comprises a broad annular groove 62 between the central portion 4 and a wedge-like annular web 63. The sides of the central portion 4 and the annular web 63 facing one another extend parallel to one another and at right angles about the pipe axis. In the region adjoining the annular web 63, the bottom of the annular groove 62 comprises a type of tooth formation 64, constituted by altogether five small annular grooves.

Towards the free end the support sleeve 3, besides the first sealing web 5 with a sealing surface 7 directed towards the central portion 4, comprises a second sealing web 65, with a sealing surface 66, likewise directed towards the central portion 4. Both sealing webs 5, 65 are designed like the sealing webs 5 in the preceding embodiments and are therefore identical. At the end of the support sleeve 3, a further sealing web 67 with a sealing surface 68 is formed, having a rectangular cross-section.

The pipe coupling 1 comprises a spring means 52, composed substantially of two parts, that is to say a spring ring 69 and a pressure sleeve 70. The spring ring 69 consists of an elastically deform able, thermoplastic plastics material and has a rectangular cross-section in its original state. It fills out substantially the whole of the annular groove 62 and has been inserted into the annular groove 62 by sliding over the obliquely rising part of the annular web 63 with elastic expansion.

The pressure sleeve 70 surrounds the spring ring 69 only in part, extending to the region of the sealing webs 65, 67. By means of depressions 71, distributed over the periphery, it is connected to the spring ring 69 in a form-fitting manner. The pipe coupling 1 and the spring means 52 thus form a preassembled unit. In this context an annular space 72 is formed between the pressure sleeve 70 and the support sleeve 3 into which a pipe—in the present case a composite pipe 31—can be inserted, namely up to the abutment (indicated by dashed lines) constituted by the annular web 63. Insertion of the composite pipe 31 up to the continuous line is, however, adequate for the function of the connection. During insertion the pressure sleeve 70 has a centring action on the composite pipe 31.

Above the pressure sleeve 70 one of the jaws 17 is located. In the present example it not only comprises the two pressing webs 18, 19, positioned on the outside, but also two further pressing webs 73, 74, each offset in spaced apart relationship towards the inside. On both ends the pressure sleeve 70 has marginal webs 75, 75, projecting radially outwardly, serving to align the jaw 17 in that they guide and engage the outer pressing webs 18, 19 during pressure deformation. This ensures that the pressure force is exerted onto the intended locations. It stands to reason that other engagement facilities may also be provided in order to align the jaw 17 and therefore the associated pressing device in relation to the pressure sleeve 70.

After insertion of the composite pipe 31, the pressure deformation procedure can be introduced by the radial movement of the jaws 17. In the process the spring ring 69 and the composite pipe 31 are pressure deformed, acquiring the shapes in the final pressing state illustrated in FIG. 21. The portion of the spring ring 69 loaded by the pressure sleeve 70, is pressure deformed radially, whereby a form-fitting relationship with the tooth formation 64 comes about as well. The material of the spring ring 69 extends on the one hand axially over the annular web 63 in the direction of the composite pipe 61, while extending radially outwardly in the section between the pressure sleeve 70 and the central portion 4. The facility for free expansion provided here is essential, in order to make it possible for the spring ring 69 to increase in volume due to a rise in temperature.

At the same time, the composite pipe 31 is pressure deformed radially inwardly, the sealing webs 5, 65, 67 penetrating into the plastics layer 32 of the composite pipe 31. In the process two spaced apart constrictions 77, 78, are moulded into the pressure sleeve 70 by means of the pressing webs 19, 74, bringing about the corresponding depressions in the composite pipe 31 up to the aluminium pipe 33 so that between the pressure sleeve 70 and the composite pipe 31 a friction and form-fitting connection comes about, which, due to the deformation of the aluminium pipe 33 is maintained even at high temperatures.

After the removal of the jaw 17, due to the elastic properties of the spring ring 69 and its compression, an axial force is applied to the pressure sleeve 70 in the direction of the composite pipe 31, symbolised by the drawn arrows. By way of the constrictions 77, 78, the latter is transferred to the composite pipe 31. This axial force causes the material of the plastics layer 32 to be pressure deformed against the sealing surfaces 7, 66, 68 of the sealing webs 5, 65, 67, thereby attaining a reliable three-fold sealing relationship.

It stands to reason that the compression of the spring ring 69 is performed in such a manner and that the resilient properties are so designed that, even at maximum operating conditions, in particular with regard to the temperature and the intended useful life, adequate spring lifting power and spring force is available, so as to load the sealing surfaces 7, 66, 68, ensuring therefore the tightness. The material of the spring ring 69 should in this context be the same as the material of the plastics layer 32 so that the temperature pattern is the same. The illustration shows, by the way, that a tight connection is produced even if the composite pipe 31 has not been inserted up to the annular web 63 or if it has not been cut off exactly at right angles.

The aforedescribed design of the pipe coupling 1, by the way, avoids contact of the aluminium pipe 33 with elements of the pipe coupling 1, which, apart from the spring ring 69, consists of metal. In this manner intermetallic corrosion is avoided without necessitating additional parts therefor. Apart from that, the outer surface area of the spring ring 69 offers a simple possibility between the central portion 4 and the pressure sleeve 70 to affix identification symbols, for example for marking the size of the pipe coupling, manufacturer identification or identification of approval, since the plastics material of the spring ring 69 can be easily marked, for example by the same process, by which the composite pipe 31 itself is marked. By appropriate colouring of the material of the spring ring 69 a contrast-rich writing base can be provided. It stands to reason that this saves costs as compared with embossing or engravings into metal.

In addition, the material of the spring ring 69 opens up the possibility to perform an impression into the outer sleeve of the spring ring 69 by means of the jaw 17 without this involving a substantial increase of the pressure force. Even very small and tightly adjoining symbols may be engraved in this context. As the material of the spring ring 69 is clamped between the central portion 4 and the pressure sleeve 70, it cannot flow away in the process. In this manner it can be established at a later stage by means of which pressure tool pressure deformation had been performed, i.e. it can be proven if pressure deformation has been performed by a non-fitting pressing device or by an unauthorised product.

The pipe coupling 1 according to FIGS. 20 and 21 can also be employed for pipes 2 of metal. In order to also ensure the best possible sealing relationship in this respect, it may in this instance be advantageous to dispense with the sealing web 65 and to insert into the annular groove formed in this manner between the sealing web 5 and the sealing web 67 an O-shaped ring of elastomer material or plastics to serve as a sealing ring, projecting somewhat beyond the two outer confinements of the sealing webs 5, 67.

FIGS. 22 and 23 show a pipe coupling 1 which, in relation to the pipe coupling 1 according to FIGS. 20 and 21, has not been modified in principle, but only with regard to the following details, so that for the remainder reference is made to the description of FIGS. 20 and 21.

The central portion 4 is widened in axial direction and externally comprises a thread 79. Screwed onto this is a compression nut 80 surrounding the spring ring 69 and the pressure sleeve 70. In this context the compression nut 80 comprises a thread 81 on the inside, matching the thread 79.

On the inner surface the compression nut 80 comprises two annular pressing webs 32, 33, which project radially inwardly, comprising conical surfaces 85, 86 towards the central portion 4. These conical surfaces 85, 86 communicate with oblique abutting surfaces 87, 88 on the outside of the pressure sleeve 70, which in their original position are opposite to the conical surfaces. In addition, the pressure sleeve 70 comprises a support web 89, extending radially towards the interior, which, in the original position (FIG. 22) rests against the obliquely rising surface of the annular web 63, blocking therefore the movement of the pressure sleeve 70 in the direction towards the central portion 4.

After insertion of the composite pipe 31 pressure deformation of the pressure sleeve 70 and thus of the spring ring 69 and of the composite pipe 61 is performed in that the compression nut 80 is turned in such a manner that it screws onto the thread 79, thereby being axially displaced towards the central portion 4. In the course thereof the pressure webs 82, 83 press sections of the pressure sleeve 70 radially towards the interior by moving via the conical surfaces 85, 86 onto their oblique stopping faces 87, 88. On the one hand, this results in a compression of the spring ring 69 in approximately the same manner as in the embodiment according to FIGS. 20 and 21 and, on the other hand, in a radial pressure deformation of the composite pipe 31, whereby in this case only one single constriction 90 is brought about in the composite pipe 31 up to the aluminium pipe 33. The action is essentially the same as in the embodiment according to FIGS. 20 and 21, i.e. an axial force is applied to the pressure sleeve 70 via the compressed spring ring 69, which, in turn, transmits the axial force to the composite pipe 31 with the result that the sealing surfaces 7, 66, 68 are loaded (cf. arrows in FIG. 23).

The particular design of the pipe coupling 1 according to FIGS. 22 and 23 is suited in particular for detachable devices, such as taps or thermostats. A special pressing tool is not required for this purpose. Provided the compression nut 80 is a hexagon nut, a spanner suffices in order to bring about the turning of the compression nut 80 and, therefore, the pressure deformation.

In FIGS. 24 and 25 the pipe coupling 1 likewise comprises a spring means 52, composed of a spring ring 69 made of a resilient plastics material and a pressure sleeve 70. The spring ring 69 is pushed onto a step-like shoulder, comprising an annular web 92 of triangular cross-section, including the spring ring 69 on the underside and keeping the latter in the position shown in FIG. 24. The spring ring 69 is chamfered towards the free end of the pipe coupling 1.

The pressure sleeve 70 engages in part over the spring ring 69 and is connected to it by way of impressions 71. Towards the free end the pressure sleeve 70 extends radially obliquely towards the interior, forming there a wide annular groove 93 together with a border web 76.

Between the spring ring 69 and the pressure sleeve 70, on the one hand, as well as the support sleeve 3, on the other, an annular space 72 is left open into which a composite pipe 31 is inserted, albeit not until abutment at the central portion 4, but at a distance from the latter, which, according to the dashed lines shown, may be smaller or, according to the continuous lines shown, may be larger. In order to prevent abutment, a stopper in the form of a projection or the like may be provided.

Pressure deformation is performed by means of jaws 17, comprising a projecting pressing web 19 on the right-hand side and a wrap-around ring 94 on the left-hand side. The pressing web 19 is so dimensioned as to just fit into the annular groove 93, so that the jaws 17 can be aligned to this annular groove 93. By the radial movement of the jaws 17 the composite pipe 31 is pressure deformed against the support sleeve 3, in which process the sealing webs 5, 65, 67 penetrate into the inner plastics layer 32. The spring ring 69 is simultaneously partly compressed in a manner similar to the working examples according to FIGS. 20 to 23, bearing in the process against the exterior of the composite pipe 1. Because of the compression, an axial force component is applied to the pressure sleeve 70 (cf. arrows in FIG. 25), which is transmitted from the latter to the composite pipe 31, as the portion of the pressure sleeve 70, bearing against the composite pipe 31, has brought about a constriction 90 in the composite pipe 31 because of pressure deformation, providing a certain form-fitting relationship. However, the axial force is transmitted in part also because of the frictional relationship between the spring ring 69 and the composite pipe 31. The pipe coupling according to FIGS. 24 and 25, in contrast to the aforedescribed embodiments, is characterised by its axially short design.

The embodiment illustrated in FIGS. 26 and 27 differs from that according to FIGS. 24 and 25 essentially in that the spring ring 69 in this case again has a rectangular cross-section and in that the pressure sleeve 70 in the section extending above the spring ring 69, comprises a pressing web 95, directed radially inwardly, terminating flush with the underside of the spring ring 69. The jaw 17, in comparison with the one shown in FIGS. 24 and 25, has merely been adapted in that a guide surface 96 for the pressing web 95 is formed.

During pressure deformation essentially the same happens as in the case of the embodiments according to FIGS. 24 and 25, i.e. the composite pipe 31 is pressure deformed against the support sleeve 3, the sealing webs 5, 65, 67 embedding themselves, the spring ring 69 is compressed and the pressing web 65 penetrates a little into the composite pipe 31 bringing about a constriction 90. In contrast to the aforedescribed embodiments, a second constriction 97 is formed here directly by the pressing web 19 at the level of the sealing webs 5, 65, 67. That is to say, in this case, the pressure sleeve 70 merely serves for the transmission of the axial force from the spring ring 69 to the composite pipe 31. The plastic deformation of the aluminium pipe 33, in particular, in the composite pipe 31 maintains the shape of the constriction 97 even after the removal of the jaw 17.

In the embodiments according to FIGS. 28 and 29, a spring means 52 is employed, by means of which an axial force is applied to the composite pipe 31 in the reverse direction, i.e. in the direction towards the central portion 4 of the pipe coupling. The spring means 52, in this case as well, consists of a spring ring 69 made of resilient plastics material and of a pressure sleeve 70 including the spring ring 69 on the outside. The pressure sleeve 70 towards the central portion 4 comprises a marginal web 98 directed radially inwardly in an oblique manner, including an annular groove 99 in a form-fitting manner, whereby the pressure sleeve 70 is fixed in axial direction. On the free side there is a marginal web 100, likewise directed radially inwardly in an oblique manner, the interior of which includes and guides the spring ring 69. The spring ring 69 serves simultaneously for centring during the insertion of the composite pipe 31.

For sealing, merely two sealing webs 5, 65 are provided, which, in the present case, are, however, oriented inversely so that their sealing surfaces 7, 66 point towards the free end of the support sleeve 3. In addition, an annular web 101 is provided, which has, however, no sealing function in this case.

A simple wrap-around ring serves as a pressing tool 17, applied approximately centrally in relation to the spring ring 69 and therefore also at the level of the sealing webs 5, 65. During pressure deformation, the composite pipe is constricted in the region of the sealing webs 5, 65 so that the sealing webs 5, 65 embed themselves in the inner plastics layer 32. The spring ring 69 is compressed at the same time. As it can only yield towards the central portion 4, a force, symbolised by the arrows, applying an axial force to the composite pipe 31 is generated by way of the frictional relationship and, in addition, also the form-fitting relationship, due to the constriction, in the direction towards the central portion 4, so that the sealing surfaces 7, 66 are pressure-loaded.

The embodiment illustrated in FIGS. 30 and 31 in principle represents a combination of the two working examples according to FIGS. 22 and 23 as well as 28 and 29. The central portion 4 of the pipe coupling 1 comprises a thread 79 onto which a compression nut 80 is screwed by its thread 81. The compression nut 80 envelopes a pressure sleeve 70, taking support on the central portion 4 and including a spring ring 69 towards the free end. This brings about the formation of an annular space 72 between the spring ring 69 and the support sleeve 3, into which a composite pipe 31 is inserted. However, an end-sided pipe section 20 has first been widened so that it can be pushed over the sealing webs 5, 65. The orientation of these sealing webs 5, 65 is the same as in the working example according to FIGS. 28 and 29.

The compression nut 80 has a conical surface 86 on the inside, communicating with and abutting against a corresponding oblique abutment surface 88 on the outside of the pressure sleeve 70. If the compression nut 80 is turned in a direction in which it screws onto the thread 79, it simultaneously moves axially towards the central portion 4. In the course thereof, the conical surface 86 causes the pressure sleeve 70 to be pressure deformed radially inwardly in the region of its oblique abutment surface 88. This, in turn, brings about a compression of the spring ring 69 with two consequences. On the one hand, the sealing webs 5, 65 penetrate into the plastics layer 32. On the other hand, an axial force, oriented towards the central portion 4, is brought about, which is transmitted to the composite pipe 31 and in this manner provides the pressure loading of the sealing surfaces 7, 66.

In the embodiment according to FIGS. 32 and 33 the spring means 52 is constituted by an ondular spring pipe 102 surrounding the support sleeve 3. It comprises a marginal web 103 directed radially inwardly, engaging an annular groove 104 in the central portion 4. Towards the free end, after a straight section 105, a wave trough 106, a wave crest 107 and once again a wave trough follow.

After this wave trough 108, the ondular spring pipe 102 once again becomes a straight section 109, including with the support sleeve 3 an annular space 72 for the composite pipe 31. The ondular spring pipe 102 terminates in an outwardly directed marginal web 110. The support sleeve 3, in turn, carries three sealing webs 5, 65, 67 with sealing surfaces 7, 66, 68, oriented towards the central portion 4.

For the pressure deformation process the composite pipe is not inserted fully into the annular space 72. Pressure deformation is subsequently performed by means of the jaws 17, comprising two pressing webs 18, 19 provided in spaced apart relationship. The right-hand pressing web 19 loads the straight section 109 of the ondular spring pipe 102, in which context the marginal web 110 forms an alignment aid. The straight section 109 is compressed and in the process presses the composite pipe 31 in such a manner that the sealing webs 5, 65, 67 engage in the plastics layer 32. In the course of this the aluminium pipe 33 is plastically deformed, i.e. it receives a constriction 90.

At the same time, the left-hand pressing web 18 enters the wave trough 108, bending its limbs apart. This can be done simultaneously with the pressure deformation of the composite pipe 31 or somewhat later. When bending apart the limbs of the wave trough 108, the ondular spring pipe 102 is plastically deformed. This brings about an axial spring force in the direction towards the free end of the support sleeve 3, transmitted to the composite pipe 31 via the pressure deformed region of the straight section 109 due to the frictional or form-fitting relationship existing there. This, in turn, provides an appropriate pressure loading of the sealing surfaces 7, 66, 68.

It stands to reason that instead of the ondular spring pipe 102 other spring types may also be considered, such as for example wave springs, flat springs or the like.

In the embodiments shown in FIGS. 34 to 37, the spring means 52 are so designed that the spring has already been pretensioned, i.e. compressed, during assembly. For this purpose the working example according to FIGS. 34 and 35 comprises a spring ring 69 of resilient plastics material, surrounding the support sleeve 3 and being axially compressed so that from its rectangular basic shape it bulges on the outside. It is axially engaged by the central portion 4 on the one hand, and by a pressure sleeve 70 on the other, namely by its radial limb 111, which in the original position (FIG. 34) engages an annular groove 112 in the support sleeve 3. The radial limb 111 is followed by an axial section 113 defining with the support sleeve 3 an annular space 72 for inserting the composite pipe 31. The composite pipe 31 is not introduced completely into this annular space 72, in which context in FIG. 34 a normal position is indicated by a continuous line and a likewise still acceptable position in dashed lines.

For the pressure deformation process simple, annular jaws 17 are used, namely at the level of the sealing webs 5, 65, 67. During the radial convergence of the jaws 17 both the pressure sleeve 70 and the composite pipe 31 are compressed, so that the sealing webs 5, 65, 67 penetrate into the plastics layer 32 of the composite pipe 31, bringing about a lasting constriction 90 in the composite pipe and also in the axial section 113 of the pressure sleeve 70.

By pressure deforming the axial section 113, the radial limb 111 is tilted out of the annular groove 112 so that its axial movability is no longer impaired. In the process the pressure force exerted by the spring ring 69 on the radial limb 111 can be transmitted to the composite pipe 31 via the axial section 113. This results, in turn, in the sealing surfaces 7, 66, 68 being put under pressure.

The aforedescribed embodiment is characterised in that the pressure force to be exerted, can be reduced, so that the pressing tool can also be designed narrower, as the spring ring 69 and the portion of the pressure sleeve 70, otherwise overlapping the latter, are not pressure deformed as well.

It stands to reason that instead of the spring ring 69 of resilient plastics material any other type of spring may be considered as well, by means of which a pressure force can be exerted on the radial limb 111, for example helical springs, disk springs, rubber springs etc. FIGS. 36 and 37 show a specific embodiment of a spring means 52, using a helical spring as the spring ring 69.

In this embodiment the helical spring 69 surrounds a pressure sleeve 70, comprising on the left-hand side a marginal web 75 projecting radially outwardly and on the right-hand side a cone 114 rising outwardly. A wrap-around ring 115 is positioned on the cone 114 having an oblique surface 116. In the original position (FIG. 36) the wrap-around ring 115 is held by a retention pin 117, guided in an appropriate recess in a sleeve-like holding device 118. The holding device 118 comprises marginal webs 119, 120 on either side, the left-hand marginal web 119 engaging an annular groove 121 so that the holding device 118 is axially fixed. The holding device 118 surrounds the helical spring 69 and the pressure sleeve 70 including the wrap-around ring 115.

The wrap-around ring 70 and the support sleeve 3 surround an annular space 72 into which the composite pipe 31 is not fully inserted (continuous or dashed position). After insertion the retention pin 117 is pulled towards the outside. The helical spring 69, deriving support from the left-hand marginal web 119 and from the wrap-around ring 115, now pushes the wrap-around ring 115 towards the right-hand marginal web 120 of the holding device 118. The spring force is so strong that in the process the cone 114 of the pressure sleeve 70 is bent towards the composite pipe 31 bringing about an inwardly oriented cone 114 which penetrates into the composite pipe 31 in such a manner as to bring about a compression 90. In the process the wrap-around ring 115 comes to bear on the right-hand marginal web 120 of the holding device 118.

Because of the constriction 90 both sealing webs 5, 65 penetrate into the plastics layer 32. The sealing surfaces 7, 66 of the sealing webs 5, 65 are oriented towards the free end of the support sleeve 3. The helical spring 69 strives to move the pressure sleeve 70 over the marginal web 75 towards the central portion 4. By way of the form-fitting relationship of the cone 114 with the composite pipe 31 this force is transmitted to the composite pipe 31 so that an axial force occurs, directed against the central portion 4. This loads the sealing surfaces 7, 66 and provides reliable sealing.

In FIGS. 38 and 39 an embodiment is illustrated which is particularly suited for a connection to a metal pipe 2. The support sleeve 3 comprises a broad annular groove 62 into which a spring ring 69 of rectangular cross-section, made of a resilient plastics material, is inserted. Instead of sealing webs, an O-ring 22 has been provided in this example, positioned on a shoulder 123 in the region of the free end of the support sleeve 3. At the end of the support sleeve 3 an annular web 125 is formed, against which the O-ring 122 rests. The annular web 125 has a lesser height than the O-ring 122.

In order to bring about the connection between the pipe coupling 1 and the pipe 2, jaws 17 are employed, which are provided with a nose-shaped profile 126 on the inside. This causes the deformation of the pipe 2 when the jaws 17 are brought together, as shown in FIG. 37, i.e. a wave-like constriction 90 is generated extending up to the support sleeve 3. In the process the spring ring 59 is likewise compressed in the region over which the pipe 2 engages, deriving support from the central portion 4. The resulting pressure forces are transmitted to the pipe 2 in axial direction via the constriction 90, pushing it against the O-ring 122. In order to avoid overpressing, a stopper may be provided between the constriction 90 and the O-ring 122, limiting the axial movability of the pipe 2 towards the central portion 4.

Here as well, it is essential for the spring ring 69 to have a free space 21 for expansion, permitting free expansion during heating.

What is claimed is:

1. Process for connecting a pipe (2, 31) in the region of its pipe end to a pipe coupling (1), comprising at least one support sleeve (3) with an engagement means (5, 65, 67, 124), wherein the pipe (2, 31) and the support sleeve (3) are first pushed into one another, the pipe (2, 31) then being pressure deformed, thereby bringing about a form-fitting connection with the engagement means (5, 65, 67, 125) and bringing about a sealing relationship with sealing surfaces (7, 66, 68, 122), mutually adjoining each other in axial direction, characterized in that an axial force, bearing on the sealing surfaces (7, 66, 68, 122) is applied to the pipe (2, 31) by a pressure sleeve acted on by a spring means (20, 52) radially deformed by said pressure sleeve and deriving support from the pipe coupling (1), said spring means creating said axial force due to said radial deformation.

2. Process according to claim 1, characterised in that the axial force application is performed simultaneously or after pressure deformation of the pipe (2, 31).

3. Process according to claim 1, characterised in that the pressure sleeve is pushed over the pipe (2, 31), at least in the region of the engagement means (5, 65, 67), which is likewise pressure deformed by plastic deformation.

4. Connection between a pipe (2, 31) in the region of its pipe end and a pipe coupling (1), comprising at least one support sleeve with an engagement means (5, 65, 67, 124), the pipe (2, 31) entering into a form-fitting connection with the engagement means (5, 65, 67, 125), due to plastic deformation, bringing about a sealing of the sealing surfaces (7, 66, 68, 122), adjoining one another in axial direction, characterized in that at least one spring means (20, 52) is provided, deriving support from the pipe coupling (1), said spring means radially deformed by a pressure sleeve, and said pressure sleeve acted on by said spring means to generate an axial force which bears on the sealing surfaces (7, 66, 68, 122) due to said radial deformation.

5. Connection according to claim 4, characterized in that the pipe (2, 31) is surrounded by and pressure deformed jointly with the pressure sleeve at least in the region of the engagement means (5, 65, 67).

6. Connection according to claim 4, characterised in that the spring means (52) constitutes an additional component, which is in co-active engagement with the pipe (2, 31) for applying the axial force.

7. Connection according to claim 6, charaterized in that the additional component is a spring element (69), said spring element tensioned by the pressure sleeve (70).

8. Connection according to claim 7, characterised in that the pressure sleeve (70) extends over the pipe (2) and is pressure deformed together with the latter.

9. Pipe coupling (1) for the connection to a pipe (2, 31), comprising at least one support sleeve (3) with at least one engagement means (5, 65, 67, 125), characterized in that at least one spring means (52) is provided, deriving support from the pipe coupling (1), said spring means radially deformed by a pressure sleeve adapted to be brought into co-active engagement with a pipe (2, 31) adapted to be pushed onto the support sleeve (3) by said pressure sleeve due to said radial deformation of said spring means.

* * * * *